(12) United States Patent
Mappes et al.

(10) Patent No.: US 11,614,640 B2
(45) Date of Patent: Mar. 28, 2023

(54) SPECTACLE LENS AND METHOD, IN PARTICULAR 3D PRINTING METHOD, FOR THE PRODUCTION THEREOF

(71) Applicant: Carl Zeiss Vision International GmbH, Aalen (DE)

(72) Inventors: Timo Mappes, Karlsruhe (DE); Gerhard Kelch, Aalen (DE); Thomas Glöge, Schorndorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 1015 days.

(21) Appl. No.: 16/387,521

(22) Filed: Apr. 17, 2019

(65) Prior Publication Data

US 2019/0250430 A1   Aug. 15, 2019

Related U.S. Application Data

(63) Continuation of application No. PCT/EP2017/076825, filed on Oct. 20, 2017.

(30) Foreign Application Priority Data

Oct. 21, 2016 (EP) .................... 16195139

(51) Int. Cl.
*G02C 7/08* (2006.01)
*G02C 7/02* (2006.01)
(Continued)

(52) U.S. Cl.
CPC ............ *G02C 7/088* (2013.01); *B29C 64/106* (2017.08); *B29D 11/00009* (2013.01);
(Continued)

(58) Field of Classification Search
CPC ..... G02C 7/088; G02C 7/022; G02C 2202/12; G02C 2202/16; B29C 64/106;
(Continued)

(56) References Cited

U.S. PATENT DOCUMENTS 3,998,531 A   12/1976   Marzouk
4,679,918 A   7/1987   Ace
(Continued)

FOREIGN PATENT DOCUMENTS

AU   64179/80 A   5/1981
AU   531647 B2   9/1983
(Continued)

OTHER PUBLICATIONS

Office action by the Chinese Patent Office issued in CN 201780070669.X, which is a counterpart hereof, dated Mar. 16, 2020, and English-language translation thereof.
(Continued)

*Primary Examiner* — Robert E. Tallman
(74) *Attorney, Agent, or Firm* — Tautz & Schuhmacher LLC; Georg Hasselmann

(57) ABSTRACT

A spectacle lens has, starting from the object-sided front surface of the spectacle lens to the opposite rear-side of the spectacle lens, at least a) one component A including at least one functional layer $F_A$ and/or an ultrathin glass, b) one component B including at least one polymer material and, c) one component C, including at least one functional layer F and/or an ultrathin glass. A method, in particular a 3D printing method, for producing the spectacle lens is also disclosed.

20 Claims, 12 Drawing Sheets

(51) Int. Cl.
  *B29D 11/00* (2006.01)
  *B29C 64/106* (2017.01)
(52) U.S. Cl.
  CPC .. *B29D 11/00432* (2013.01); *B29D 11/00442* (2013.01); *G02C 7/022* (2013.01); *G02C 2202/12* (2013.01); *G02C 2202/16* (2013.01)
(58) Field of Classification Search
  CPC ........ B29D 11/00009; B29D 11/00432; B29D 11/00442
  See application file for complete search history.

(56) References Cited

U.S. PATENT DOCUMENTS

| | | | |
|---|---|---|---|
| 5,148,205 | A | 9/1992 | Guilino et al. |
| 5,343,260 | A | 8/1994 | Henry et al. |
| 5,959,761 | A | 9/1999 | Perrott et al. |
| 6,079,827 | A | 6/2000 | Coleman et al. |
| 6,712,466 | B2 | 3/2004 | Dreher |
| 6,863,397 | B2 | 3/2005 | Nakano |
| 7,217,375 | B2 | 5/2007 | Lai |
| 7,420,743 | B2 | 9/2008 | Lai et al. |
| 8,034,262 | B2 | 10/2011 | Lai et al. |
| 8,790,104 | B2 | 7/2014 | Lai |
| 9,500,860 | B2 | 11/2016 | Gloege et al. |
| 9,957,398 | B2 | 5/2018 | Hugenberg et al. |
| 10,179,831 | B2 | 1/2019 | Weippert |
| 10,520,756 | B2* | 12/2019 | Gallina ............... B29D 11/00 |
| 2003/0003295 | A1 | 1/2003 | Dreher et al. |
| 2003/0090622 | A1 | 5/2003 | Takeuchi |
| 2003/0143391 | A1 | 7/2003 | Lai |
| 2005/0046957 | A1 | 3/2005 | Lai et al. |
| 2005/0057815 | A1* | 3/2005 | Lai ............... B29D 11/00355 359/652 |
| 2007/0076167 | A1 | 4/2007 | Kumar et al. |
| 2011/0262711 | A1 | 10/2011 | Chopra et al. |
| 2013/0274381 | A1 | 10/2013 | Hugenberg et al. |
| 2015/0276987 | A1 | 10/2015 | McKenzie et al. |
| 2016/0161761 | A1 | 6/2016 | Quere et al. |
| 2017/0297955 | A1 | 10/2017 | Gloege |
| 2019/0240938 | A1 | 8/2019 | von Blanckenhagen et al. |

FOREIGN PATENT DOCUMENTS

| | | |
|---|---|---|
| BR | 9300027 A | 8/1993 |
| CA | 1139952 A1 | 1/1983 |
| CA | 1144466 A1 | 4/1983 |
| CN | 109937135 A | 6/2019 |
| DE | 3821079 A1 | 12/1989 |
| DE | 19848591 A1 | 10/1999 |
| DE | 69534779 T2 | 7/2006 |
| DE | 102009004377 A1 | 7/2010 |
| DE | 102014202609 A1 | 8/2015 |
| DE | 102015209794 A1 | 12/2016 |
| EP | 28974 A1 | 5/1981 |
| EP | 28975 A1 | 5/1981 |
| EP | 182503 A2 | 5/1986 |
| EP | 1918760 A1 | 5/2008 |
| EP | 2578649 B1 | 4/2013 |
| EP | 2664659 A1 | 11/2013 |
| EP | 2878989 A1 | 6/2015 |
| FR | 2687482 A1 | 8/1993 |
| JP | 06027423 A | 2/1994 |
| JP | 2002031701 A | 1/2002 |
| JP | 2005507092 A | 3/2005 |
| JP | 2005532598 A | 10/2005 |
| JP | 2005535921 A | 11/2005 |
| JP | 2006502443 A | 1/2006 |
| JP | 2008512704 A | 4/2008 |
| JP | 2008191186 A | 8/2008 |
| WO | 2006029268 A2 | 3/2006 |
| WO | 2006050891 A2 | 5/2006 |
| WO | 2015004383 A1 | 1/2015 |
| WO | 2015121341 A1 | 8/2015 |
| WO | 2016094706 A1 | 6/2016 |

OTHER PUBLICATIONS

Office Action by the Chinese Patent Office issued in CN 201780070669.X, which is a counterpart hereof, dated Sep. 12, 2019, and English language translation thereof.

Extended European Search Report of the European Patent Office issued in EP 16195139.7, which is a counterpart hereof, dated Apr. 13, 2017, and English-language translation thereof.

Communication pursuant to Article 94(3) EPC of the European Patent Office issued in EP 16195139.7, which is a counterpart hereof, dated Dec. 11, 2018, and English-language translation thereof.

International Preliminary Report on Patentability issued in PCT/EP2017/076825, to which this application claims priority, completed Mar. 8, 2019, and English-language translation thereof.

Opposition against EP 3 312 661 B1 filed in the European Patent Office on Oct. 8, 2020, and English-language machine translation thereof.

International Search Report of the International Searching Authority issued in PCT/EP2017/076825, to which this application claims priority, dated Jan. 19, 2018, and English-language translation thereof.

Written Opinion of the International Searching Authority issued in PCT/EP2017/076825, to which this application claims priority, dated Sep. 21, 2018, and English-language translation thereof.

Submission by opponent in opposition proceeding of European patent 3312661, which is a counterpart hereof, mailed Jan. 28, 2022, and English-language machine translation thereof.

Submission by patent owner in opposition proceeding of European patent 3312661, which is a counterpart hereof, mailed Feb. 28, 2022, and English-language machine translation thereof.

Submission by opponent in opposition proceeding of European patent 3312661, which is a counterpart hereof, mailed Apr. 13, 2022, and English-language machine translation thereof.

Office action by the Indian Patent Office issued in IN 201917015237, which is a counterpart hereof, dated Sep. 7, 2020.

Koeppen: "Konzeption und Entwicklung von Gleitsichtglaesem," DOZ, pp. 42-45, and English-language translation thereof, Oct. 1995.

"Ophthalmic optics—Spectacle lenses—Vocabulary (ISO 13666:2012)," German and English version EN ISO 13666:2012, Oct. 2013.

Office action by the Canadian Patent Office issued in CA 3,040,854 which is a counterpart hereof, dated May 30, 2019.

Office action by the Japanese Patent Office issued in JP 2019-520988, which is a counterpart hereof, dated Oct. 24, 2019, and English-language translation thereof.

Office action by the Chinese Patent Office issued in CN 201780070669.X, which is a counterpart hereof, dated Dec. 2, 2019, and English-language translation thereof.

* cited by examiner

SPECTACLE LENS AND METHOD, IN PARTICULAR 3D PRINTING METHOD, FOR THE PRODUCTION THEREOF

CROSS REFERENCE TO RELATED APPLICATIONS

This application is a continuation application of international application PCT/EP2017/076825, filed Oct. 20, 2017, which claims priority to European patent application DE 16195139.7, filed Oct. 21, 2016, both of which are hereby incorporated by reference in their entireties.

TECHNICAL FIELD

The present disclosure relates to a spectacle lens comprising at least components A, B, and C. The present disclosure further relates to a process, especially a 3D printing process, for producing this spectacle lens.

BACKGROUND

Spectacle lenses are distinguished between spectacle lenses having no nominal dioptric power and corrective spectacle lenses, i.e. spectacle lenses having dioptric power. According to DIN EN ISO 13666, dioptric power is the collective term for the focusing and the prismatic power of a spectacle lens.

In the case of corrective spectacle lenses, a distinction is also drawn between monofocal spectacle lenses and multifocal spectacle lenses. A monofocal spectacle lens is a spectacle lens in which there is only one dioptric power. A multifocal spectacle lens is a spectacle lens in which there are two or more different regions having different dioptric powers in the spectacle lens.

The shape that the spectacle lens has to adopt on its front face and/or reverse face in order to obtain the desired optical correction is determined to a crucial degree by the material from which the spectacle lens is manufactured. The most important parameter here is the refractive index of the material used. While spectacle lenses used to be produced predominantly from mineral glasses, especially crown glasses (Abbe number >55) and flint glasses (Abbe number <50), spectacle lenses made from a multitude of organic materials have now become available. The refractive index of the mineral glasses suitable for spectacle lenses may be higher than the refractive index of the organic materials usable for spectacle lenses. Particular features of spectacle lenses based on mineral glasses are their high scratch resistance and good chemical stability. By comparison, spectacle lenses based on organic materials have the particular features of lower specific weight and high fracture resistance.

Spectacle lenses based on mineral glasses are regularly produced by mechanically abrasive machining of a spectacle lens blank. In a spectacle lens blank, neither the front face nor the reverse face already corresponds to the ultimate, optically effective target faces. The optical face of a spectacle lens destined for arrangement on the object side is referred to as the front face; the optical face of a spectacle lens destined for arrangement on the eye side is referred to as the reverse face. The face between them, which either directly forms an edge or indirectly adjoins the front face at one end and the reverse face at the other end via an edge face, is referred to as cylinder edge face. The above-defined terms "front face," "reverse face," and "cylinder edge face" are used analogously hereinafter for semifinished spectacle lenses and finished spectacle lenses.

Spectacle lenses based on organic materials are cast, for example, as semifinished spectacle lenses with spherical, rotationally symmetric, aspherical or progressive front faces in mass production in prototypes with front face and reverse face mold shells that are spaced apart from one another by means of a sealing ring, forming a cavity, as described, for example, in JP 2008191186 A. The reverse face of a semifinished spectacle lens thus produced can, for example, be machined in a mechanically abrasive manner to obtain a finished spectacle lens.

Semifinished spectacle lenses, also referred to as semifinished products, are spectacle lens blanks having a front face or reverse face that already corresponds to the ultimate, optically effective target face. Finished spectacle lenses, also referred to as ready-made or finished products or ready-made spectacle lenses, are spectacle lenses having a front face and reverse face that is already the ultimate, optically effective target face. Finished spectacle lenses may, for example, either be cast as finished spectacle lenses, for example in prototypes with front and reverse face mold shells spaced apart from one another by means of a sealing ring, forming a cavity, or be manufactured by means of an Rx process. Finished spectacle lenses are generally also edged, i.e. converted to the ultimate shape and size matched to the spectacle frame by edge processing.

EP 0 182 503 A2 discloses an ophthalmic composite spectacle lens comprising a thin glass layer having a thickness of 0.5 mm to 2.0 mm on the object side and a plastic layer on the eye side. The glass layer and the plastic layer are bonded to one another by a highly elastic adhesive. The reverse face of the glass layer here has a different curvature than the front face of the plastic layer. The gap that arises as a result at the edge in particular is filled by the adhesive used.

SUMMARY

It is an object of the present disclosure to provide a spectacle lens having a dioptric power that does not result exclusively, if at all, from the interplay of the optically active surfaces. It is a further object of the disclosure to provide a simple process for producing such a spectacle lens.

This object is achieved by providing a spectacle lens comprising, proceeding from the front face on the object side of the spectacle lens to the opposite reverse face of the spectacle lens, at least
a) a component A having at least a functional layer $F_A$ and/or an ultrathin lens,
b) a component B having at least a polymeric material having a location-dependent refractive index distribution,
c) a component C having at least a functional layer $F_C$ and/or an ultrathin lens, or
d) a component A having at least an ultrathin lens having an average thickness from a range from 10 µm to 760 µm,
e) a component B having at least a polymeric material, where the polymeric material has a uniform refractive index,
f) a component C having at least a functional layer $F_C$ and/or an ultrathin lens having an average thickness from a range from 10 µm to 760 µm.

Exemplary embodiments of the spectacle lens according to the disclosure are described below.

The object of the disclosure is also achieved by providing a process for producing a spectacle lens comprising, proceeding from the front face on the object side of the spectacle lens to the opposite reverse face of the spectacle lens, at least components A, B, and C, wherein component A comprises at least a functional layer $F_A$ and/or an ultrathin lens, component B comprises at least a polymeric material, component C comprises at least a functional layer $F_C$ and/or an ultrathin lens, and the process comprises the following steps:
a) providing and optionally fixing the ultrathin lens of component A or C or providing a support structure corresponding to the negative mold of the front face $V_B$ or of the reverse face $R_B$ of component B,
b) providing a three-dimensional model of component B,
c) digitally cutting the three-dimensional model from step b) into individual two-dimensional slices,
d) providing at least one printing ink, typically 3D printing ink, where the printing ink comprises at least one radiation-curable component,
e) constructing component B from the sum total of the individual two-dimensional slices from step c) by means of a printing operation on one of the ultrathin lenses of component A or C or on the support structure,
f) curing component B by means of UV light, wherein the curing can be effected fully or partially after each application of individual volume elements or after application of a slice of volume elements, and the partial curing can be completed on completion of the printing process,
g) optionally machining and/or grinding and/or turning and/or polishing the surface of component B obtained in step f) that does not adjoin one of the ultrathin lenses of component A or C or the support structure,
h) h1) if the ultrathin lens of component A has been provided in step a): bonding the reverse face $R_B$ of component B of the spectacle lens obtained in step f) comprising components A and B to the front face $V_{DC}$ of the ultrathin lens of component C or coating the reverse face $R_B$ of component B with at least a functional layer $F_C$; h2) if the ultrathin lens of component C has been provided in step a): bonding the front face $V_B$ of component B of the spectacle lens obtained in step f) comprising components B and C to the reverse face $R_{DA}$ of the ultrathin lens of component A or coating the front face $V_B$ of component B with at least a functional layer $F_A$; h3) if a support structure has been provided in step a): coating the front face $V_B$ with the functional layer $F_A$ and coating the reverse face $R_B$ with the functional layer $F_C$, in each case by means of a printing method or by means of a spin-coating method, and
i) edging the spectacle lens obtained in step h) comprising components A, B, and C.

Exemplary embodiments of the process according to the disclosure are disclosed below.

The spectacle lens of the disclosure comprises at least one component A, at least one component B and at least one component C. Component A may comprise an ultrathin lens and/or a functional layer $F_A$. Component A adjoins component B on the object side in the spectacle lens of the disclosure. Component C may comprise an ultrathin lens and/or a functional layer $F_C$. Component C adjoins component B on the eye side in the spectacle lens of the disclosure. If both component A and component C comprise at least one ultrathin lens, the two ultrathin lenses may be of identical or different configuration. For example, the ultrathin lens of component A and the ultrathin lens of component C may be identical or different in terms of glass composition, shape and/or average thickness. In a exemplary embodiment of the disclosure, component A comprises an ultrathin lens, and component C either an ultrathin lens and/or a functional layer $F_C$. In a typical exemplary embodiment of the disclosure, each of component A and component C comprises an ultrathin lens which may be of identical or different configuration.

The ultrathin lens of component A and of component C may be based on various glass compositions. Component A and component C may comprise an ultrathin lens which is identical or different in relation to the glass composition. The glass composition for the ultrathin lenses may, for example, be borosilicate glass, aluminoborosilicate glass or alkali-free borosilicate glass. Typically, the ultrathin lens of component A or of component C is based in each case on a borosilicate glass or an aluminoborosilicate glass.

The ultrathin lens of component A or of component C in each case typically has an average thickness from a range from 10 μm to 1000 μm, further typically from a range from 13 μm to 760 μm, further typically from a range from 16 μm to 510 μm, more typically from a range from 18 μm to 390 μm and most typically from a range from 19 μm to 230 μm. Especially typically, the ultrathin lens of component A or the ultrathin lens of component C in each case has an average thickness from a range from 21 μm to 121 μm.

The average thickness of the ultrathin lens of component A or of component C is understood in each case to mean the arithmetic average, unless stated otherwise.

Below an average thickness of 10 μm, the ultrathin lens of component A or of component C is too mechanically unstable to be able to be used in one of the processes described hereinafter for production of a spectacle lens of the disclosure. Above an average thickness of 1000 μm, the ultrathin lens of component A or of component C can lead to spectacle lenses of the disclosure that would have too great an edge thickness or too great a middle thickness of the spectacle lens.

The average thickness of the ultrathin lens of components A and C is measured in each case typically with the Filmetrics F10-HC instrument (from Filmetrics Inc.). The average thickness of the ultrathin lens of components A and C is typically determined in each case using the ultrathin lens in the form as it is actually used. The average thickness of the ultrathin lens of components A and C is thus determined in each case either using a planar ultrathin lens or using a formed ultrathin lens prior to the joining to component B. Alternatively, the average thickness of the ultrathin lens of components A and C can be determined in each case by means of a scanning electron micrograph using a polished section. The respective average thickness can be determined by means of a scanning electron micrograph either using the ultrathin lens of component A, using the ultrathin lens of component C or using the inventive spectacle lens comprising components A, B, and C. For this purpose, the thickness of the ultrathin lens of component A or of component C is determined in each case at at least 100 sites and statistically averaged. Typically, the average thickness of the ultrathin lens of component A or of component C is determined by means of a scanning electron micrograph using a polished section of the spectacle lens of the disclosure. If further components are present in the spectacle lens of the disclosure, the respective average thickness thereof is likewise determined as described above.

In one exemplary embodiment, the relative standard deviation of the thickness distribution of the ultrathin lens of component A or C is in each case 0.1% to 100%, typically 0.2% to 81%, more typically 0.3% to 66% and most typically 0.4% to 24%. The relative standard deviation in [%] is the quotient of calculated standard deviation and average thickness.

The ultrathin lens of component A and of component C may have the same average thickness in each case. The average thicknesses of the ultrathin lenses of components A and C may also be different. Typically, the average thicknesses of the ultrathin lenses of components A and C are each the same.

The ultrathin lens of component A or of component C in each case typically has a surface roughness Ra of <1 nm. Further typically, the surface roughness Ra of the ultrathin lens of component A or of component C is in each case within a range from 0.1 nm to 0.8 nm, more typically within a range from 0.3 nm to 0.7 nm and most typically within a range from 0.4 nm to 0.6 nm. The aforementioned values for surface roughness Ra are each based on the front face and the reverse face of the ultrathin lens of component A or C of an unformed, planar ultrathin lens. After forming, the aforementioned values are in each case applicable only to that area of the ultrathin lens that has not been brought into contact with the shaped body. Depending on the shaped body used for forming, the aforementioned values may also be applicable to the area of the ultrathin lens that was in contact with the shaped body used for forming. The surface roughness Ra of the ultrathin lens of component A or of component C is typically determined by means of white light interferometry, typically with the NewView 7100 instrument (from Zygo Corporation).

If the ultrathin lens of component A or of component C has further superficial unevenness, the area analysis of the respective surface can also be determined by phase-measuring deflectometry, typically with the SpecGage instrument (from 3D-Shape GmbH).

The transformation temperature $T_G$ of the ultrathin lens of component A or of the ultrathin lens of component C is in each case typically within a range from 400° C. to 800° C., further typically within a range from 430° C. to 770° C., more typically within a range from 490° C. to 740° C. and most typically within a range from 530° C. to 730° C. The transformation temperature $T_G$ of the ultrathin lens of component A or C can determined in each case by means of dynamic-mechanical analysis, typically with the DMA 8000 Dynamic Mechanical Analyzer instrument (from Perkin Elmer Inc.), or by means of dynamic differential calorimetry, typically with the DSC204CEL instrument with TASC414/3A or CC2001 controller (each from Erich NETZSCH GmbH & Co. Holding KG). Typically, the transformation temperature $T_G$ of the ultrathin lens of component A or C is determined in each case by means of dynamic differential calorimetry.

The coefficient of expansion of the ultrathin lens of component A or of component C is in each case typically within a range from $1.8 \cdot 10^{-6}$ K$^{-1}$ to $9.1 \cdot 10^{-6}$ K$^{-1}$, further typically within a range from $2.1 \cdot 10^{-6}$ K$^{-1}$ to $8.8 \cdot 10^{-6}$ K$^{-1}$, more typically within a range from $2.6 \cdot 10^{-6}$ K$^{-1}$ to $8.2 \cdot 10^{-6}$ K$^{-1}$ and most typically within a range from $3.0 \cdot 10^{-6}$ K$^{-1}$ to $7.4 \cdot 10^{-6}$ K$^{-1}$, based in each case on the temperature range from 20° C. to 300° C. The coefficient of expansion of the ultrathin lens of component A or of component C is typically detected in each case by means of dilatometry, typically with the DIL 402 E/7 instrument (from Erich NETZSCH GmbH & Co. Holding KG).

The ultrathin lens of component A or of component C typically in each case does not comprise any colorants. Further typically, the transmittance of the ultrathin lens of component A or of component C in the wavelength range from 400 nm to 800 nm is in each case ≥90%, more typically ≥92%. The transmittance of the ultrathin lens of component A or of component C is typically determined by means of a UV/VIS spectrophotometer, typically with the LAMBDA 950 UV/Vis/NIR Spectrophotometer (from Perkin Elmer Inc.).

The ultrathin lens of component A or of component C in each case typically has a refractive index from a range of n=1.490 to n=1.950, further typically from a range of n=1.501 to n=1.799, more typically from a range of n=1.510 to n=1.755 and most typically from a range from n=1.521 to n=1.747, where the refractive index is reported for the wavelength of the sodium D line. The refractive index of the respective ultrathin lens of component A or of component C is typically matched to the respectively directly adjoining functional layer $F_A$ or $F_C$ and/or the respectively directly adjoining component, typically component B. If component B has a uniform refractive index, the difference in refractive index between component B and a directly adjoining functional layer or component is typically not greater than 0.3, more typically not greater than 0.1 and most typically not greater than 0.05. If component B has a location-dependent refractive index distribution, the average refractive index of component B differs from a directly adjoining functional layer or component typically by not more than 0.3, more typically by not more than 0.1 and most typically by not more than 0.05. The refractive index of the ultrathin lens of component A and of component C, of component B and of further components of the spectacle lens of the disclosure is typically determined separately by refractometry on the respective constituents of the spectacle lens of the disclosure. The measuring instrument used may, for example, be the Anton Paar Abbemat MW instrument (from Anton Paar GmbH).

The ultrathin lens of component A or of component C in each case typically has an Abbe number from a range from 20 to 85, further typically from a range from 23 to 74, more typically from a range from 29 to 66 and most typically from a range from 33 to 61.

In one exemplary embodiment of the disclosure, the ultrathin lens of component A or of component C and the organic material of component B of component B each have a maximum Abbe number for a given refractive index n.

In one exemplary embodiment of the disclosure, the ultrathin lens of component A or of component C in each case has a transformation temperature $T_G$ from a range from 421° C. to 781° C., typically from a range from 501° C. to 766° C., and in each case has a coefficient of expansion for the temperature range from 20° C. to 300° C. from a range from $2.9 \cdot 10^{-6}$ K$^{-1}$ to $8.3 \cdot 10^{-6}$ K$^{-1}$, typically from a range from $3.1 \cdot 10^{-6}$ K$^{-1}$ to $7.3 \cdot 10^{-6}$ K$^{-1}$. In this exemplary embodiment, the transformation temperature $T_G$ and/or the coefficient of expansion of the ultrathin lens of component A and of the ultrathin lens of component C may each be the same or different.

In a further exemplary embodiment of the disclosure, the ultrathin lens of component A or of component C in each case has an average thickness from a range from 17 μm to 190 μm, typically from a range from 24 μm to 166 μm, and a transformation temperature $T_G$ from a range from 510° C. to 730° C., typically from a range from 555° C. to 721° C. In this exemplary embodiment, the average thickness and/or transformation temperature $T_G$ of the ultrathin lens of component A and of the ultrathin lens of component C may each be the same or different.

In an exemplary embodiment, the ultrathin lenses of components A and C and further ultrathin lenses optionally present in the spectacle lens of the disclosure have no photochromic properties.

Ultrathin lenses are commercially available, for example, under the D 263® T eco, AF 32® eco (each from Schott AG) or Corning Willow Glass (from Corning Inc.) names.

The ultrathin lens of component A or of component C may each have different shapes, for example planar or a particular shape. In connection with the shape of the ultrathin lens, "planar" is understood to mean that the ultrathin lens does not have any macroscopically visible bending or curvature. If the ultrathin lenses of components A and C have a nonplanar surface, it is possible to achieve a desired surface topography, for example spherical or toric, by deforming a planar ultrathin lens on a corresponding negative mold. For example, the ultrathin lens of component A or of component C may in each case be configured in the form of a spherical lens with a particular radius of curvature. The shape of the ultrathin lens of components A and C may be identical or different. For forming of a planar ultrathin lens, it may first be cut out, typically in the form of a circle, for example by means of a laser. In the edge region, this cut-out ultrathin lens circle may then be flame-treated in order to seal any microcracks that have formed. In order to produce a minimum amount of ultrathin lens offcut material, the cutout of the ultrathin lens is selected such that a minimum amount of excess ultrathin lens has to be removed after the joining of components A, B, and C of the spectacle lens of the disclosure. The cut-out ultrathin lens may, for example, be placed onto a mold shell suitable for forming, optionally secured by means of a holder, and typically heated together with the mold shell, optionally together with the holder, up to the transformation temperature $T_G$ of the glass composition or up to a temperature which is typically not more than 20° C. above the transformation temperature $T_G$ of the glass composition. The mold shell may, for example, have a convex or concave shape. For example, the cut-out ultrathin lens is pressed into the mold shell with the aid of a counterpart that fits into the mold shell, or the ultrathin lens cutout is formed into the mold shell with application of reduced pressure and/or simply by means of gravity. Preference is given to forming of the ultrathin lens with application of reduced pressure into a mold shell. The formed ultrathin lens is typically allowed to cool completely in or above the mold shell before it is separated from the mold shell. The forming of a typically planar cutout of an ultrathin lens is typically effected in a protective gas atmosphere. The mold shell may be configured here as negative mold of the front face or reverse face of the ultrathin lens to be achieved in the forming operation. For example, the mold shell may be formed spherically, aspherically, rotationally symmetrically, torically, atorically, or as a symmetric free-form face or unsymmetric free-form face. Alternatively, the ultrathin lens may be formed in uncut form, typically planar form, with the aid of a thermoforming process. In the presence of further components of the spectacle lens of the disclosure comprising at least one ultrathin lens, the above details are correspondingly applicable.

The radius of curvature of an ultrathin lens is typically within a range from 10 mm to infinity, typically within a range from 20 mm to 1600 mm, further typically within a range from 35 mm to 1535 mm, further typically within a range from 56 mm to 600 mm, more typically within a range from 66 mm to 481 mm and most typically within a range from 75 mm to 376 mm. A radius of curvature of the ultrathin lens of infinity corresponds here to a planar surface. In the case of nonspherical surfaces of the ultrathin lens, the above-specified radii of curvature are each based on an approximate spherical form.

The mold shell usable for forming typically comprises a material that can be processed with removal of material, does not cause any structures in the formed ultrathin lens and additionally does not enter into any inextricable bond to the ultrathin lens. The mold shell may consist, for example, of graphite, a metal (alloy) or a ceramic, as described, for example, in WO 2006/050891 A2. The mold shell may also have been surface-modified, so as to further minimize adhesion of the ultrathin lens.

The front face of the ultrathin lens $V_{DA}$ of component A is that face of the ultrathin lens that is on the object side in the spectacle lens of the disclosure. The front face of the ultrathin lens $V_{DC}$ of component C is that face of the ultrathin lens which, in the spectacle lens of the disclosure, is on the object side in the direction of component B or in the direction of a component of the spectacle lens of the disclosure arranged further to the object side. The reverse face of the ultrathin lens $R_{DA}$ of component A is that face of the ultrathin lens which, in the spectacle lens of the disclosure, is on the eye side in the direction of component B or in the direction of a component of the spectacle lens of the disclosure arranged further to the eye side. The reverse face of the ultrathin lens $R_{DC}$ of component C is that face of the ultrathin lens that is on the eye side in the spectacle lens of the disclosure. If more than one of components A, B and/or C is present in the spectacle lens of the disclosure, the front face thereof is defined in each case as that face arranged on the object side. In that case, the reverse face is correspondingly that face of the respective component which is on the eye side in the spectacle lens of the disclosure.

The ultrathin lens of component A typically comprises at least one functional layer $F_{VA}$ on the front face of the ultrathin lens $V_{DA}$. The functional layer $F_{VA}$ may comprise, for example, at least one antireflection layer, at least one electrically conductive or semiconductive layer, at least one antifog layer and/or at least one clean-coat layer. Typically, the functional layer $F_{V}A$ comprises at least one antireflection layer, more typically at least one antireflection layer and at least one clean-coat layer, in which latter case the clean-coat layer is the outermost layer on the object side of the spectacle lens of the disclosure.

The ultrathin lens of component C typically comprises at least one functional layer $F_{RC}$ on the reverse face of the ultrathin lens $R_{DC}$. The functional layer $F_{RC}$, like the functional layer $F_{VA}$, may comprise, for example, an antireflection layer, at least one electrically conductive or semiconductive layer, at least one antifog layer and/or at least one clean-coat layer. Typically, the functional layer $F_{RC}$ comprises at least one antireflection layer, more typically an antireflection layer and a clean-coat layer, in which latter case the clean-coat layer is the outermost layer on the eye side of the spectacle lens of the disclosure.

The at least one functional layer $F_{VA}$ on the front face $V_{DA}$ of the ultrathin lens of component A and the at least one functional layer $F_{RC}$ on the reverse face $R_{DC}$ of the ultrathin lens of component C may be identical or different. Typically, the at least one functional layer $F_{VA}$ and the at least one functional layer $F_{RC}$ are identical.

If the functional layer $F_{VA}$ on the front face $V_{DA}$ of the ultrathin lens of component A and/or the functional layer $F_{RC}$ on the reverse face $R_{DC}$ of the ultrathin lens of component C respectively comprises at least one antireflection layer, it typically comprises alternating discrete metal oxide, metal hydroxide and/or metal oxide hydrate layers composed of or comprising aluminum, silicon, zirconium, titanium, yttrium, tantalum, neodymium, lanthanum, niobium and/or praseodymium. In one exemplary embodiment of the disclosure, the antireflection layer comprises at least one metal oxide, metal hydroxide and/or metal oxide hydrate layer composed of or comprising silicon, where typically at least one silicon oxide, silicon hydroxide and/or silicon oxide hydrate layer constitutes the outer layer on the object side of the antireflection layer present on the ultrathin lens of component A or the outer layer on the eye side of the antireflection layer present on the ultrathin lens of component C.

If the functional layer $F_{VA}$ on the front face $V_{DA}$ on the ultrathin lens of component A and/or the functional layer $F_{RC}$ on the reverse face $R_{DC}$ of the ultrathin lens of component C in each case comprises at least one electrically conductive or semiconductive layer, this may comprise, for example, a layer composed of or comprising indium tin oxide $((In_2O_3)_{0.9} (SnO_2)_{0.1}$; ITO), fluorine tin oxide $(SnO_2$: F; FTO), aluminum zinc oxide (ZnO:Al; AZO) and/or antimony tin oxide $(SaO_2$:Sb; ATO). Typically, the electrically conductive or semiconductive layer comprises a layer composed of or comprising ITO or composed of or comprising FTO.

If the functional layer $F_{VA}$ on the front face $V_{DA}$ on the ultrathin lens of component A and/or the functional layer $F_{RC}$ on the reverse face $R_{DC}$ of the ultrathin lens of component C in each case comprises at least one antifog layer, this typically comprises a silane derivative according to EP 2 664 659 A1, more typically according to claim 4 of EP 2 664 659 A1. Alternatively, the antifog layer may also be produced by the process described in DE 10 2015 209 794 A1, especially by the process described in claim 1 of DE 10 2015 209 794 A1. The antifog layer may be applied directly to the front face $V_{DA}$ of the ultrathin lens of component A or the reverse face $R_{DC}$ of the ultrathin lens of component C, or atop an antireflection layer present on the front face $V_{DA}$ or on the reverse face $R_{DC}$. If the antifog layer is applied atop an antireflection layer, the outer layer of the antireflection layer on the eye side or on the object side typically comprises a metal oxide, metal hydroxide and/or metal oxide hydrate layer composed of or comprising silicon.

If the functional layer $F_{VA}$ on the front face $V_{DA}$ of the ultrathin lens of component A and/or the functional layer $F_{RC}$ on the reverse face $R_{DC}$ of the ultrathin lens of component C in each case comprises at least one clean-coat layer, this typically comprises a material on which water assumes a contact angle of more than 90°, typically of more than 100° and more typically more than 110°. The clean-coat layer typically comprises an organofluorine layer with covalent attachment to the substrate according to DE 198 48 591 A1, claim 1, or a layer based on perfluoropolyethers.

In one exemplary embodiment of the disclosure, the front face of the ultrathin lens $V_{DA}$ of component A proceeding from the front face $V_{DA}$ in the direction of the object, or the reverse face $R_{DC}$ of component C proceeding from the reverse face $R_{DC}$ in the eye direction, is covered in each case by the following functional layers $F_{VA}$:
a) optionally at least electrically conductive or semiconductive layer,
b) at least one antireflection layer,
c) at least one antifog layer or at least one clean-coat layer.

In this exemplary embodiment, the at least one electrically conductive or semiconductive layer optionally present may also be part of the at least one antireflection layer.

Component A of the spectacle lens of the disclosure may, additionally or alternatively to an ultrathin lens, comprise at least one functional layer $F_A$. Component C of the spectacle lens of the disclosure may, additionally or alternatively to an ultrathin lens, comprise at least one functional layer $F_C$. In the absence of an ultrathin lens, the functional layer $F_A$ or $F_C$ is typically selected from the group consisting of at least one hard lacquer layer, typically a composition for the production of a coating having high bond strength and high scratch resistance, as described, for example, in EP 2 578 649 A1, especially in EP 2 578 649 A1, claim 1, at least one antireflection layer, at least one antifog layer, at least one clean-coat layer and at least one electrically conductive or semiconductive layer.

The coating of the front face $V_{DA}$ of the ultrathin lens of component A with at least one functional layer $F_{VA}$ and/or the coating of the reverse face $R_{DC}$ of the ultrathin lens of component C with at least one functional layer $F_{RC}$ can be effected in each case by means of a PVD method and/or a spin-coating method. The subsequent curing of the coating obtained by the spin-coating method can be effected either thermally or by radiation curing. Typically, this coating is cured by radiation curing.

The coating of the front face $V_{DA}$ of the ultrathin lens of component A with at least one functional layer $F_{VA}$ and/or the coating of the reverse face $R_{DC}$ of the ultrathin lens of component C with at least one functional layer $F_{RC}$ can be effected in each case using the ultrathin lens of component A or of component C or using the spectacle lens of the disclosure comprising at least components A, B, and C. Typically, the front face $V_{DA}$ of the ultrathin lens of component A and the reverse face $R_{DC}$ of the ultrathin lens of component C is coated using the spectacle lens of the disclosure comprising components A, B, and C.

Component B of the spectacle lens of the disclosure is produced by means of a printing method, typically 3D printing method, either by printing the reverse face $R_{DA}$ of the ultrathin lens of component A or the front face $V_{DC}$ of the ultrathin lens of component C with a typically radiation-curable 3D printing ink. Typically, component B of the spectacle lens of the disclosure is constructed by printing the reverse face $R_{DA}$ of the ultrathin lens of component A.

The surface topography of that face of component B which is not predetermined by the ultrathin lens but is opposite the face can be built up in a controlled manner by means of a printing method, especially 3D printing method. The 3D printing method is an additive manufacturing method in which the desired surface topography of one of the faces of component B is produced exclusively by material application. The three-dimensional shape of component B of the spectacle lens of the disclosure that is to be printed, which can also take account of individualized aspects, for example the diameter, the radius of curvature, or individual prescription values, for example a progression face with defined progression value and course of the progression channel, is first cut digitally into two-dimensional horizontal slices. It is of course also necessary here to take account of the effect of the ultrathin lens of component A and of the ultrathin lens of component C. It should also be taken into account that any unwanted defects present in the surface of the ultrathin lens to be printed are typically first compensated for with at least one printed slice. The information relating to the individual two-dimensional slices to be printed one on top of another is provided to the printer, especially 3D printer, and component B of the spectacle lens of the disclosure is thus constructed from the sum total of the individual two-dimensional slices. A slice to be printed comprises the adjacent arrangement of volume elements—i.e. the adjacent arrangement of printing ink, typically 3D printing ink, after release from a printhead, typically from a printhead suitable for 3D printing—in an area, where the dimensions of the volume elements depend on factors including the diameter of the printhead nozzles. The smallest possible volume element corresponds to the volume of a drop of printing ink, typically 3D printing ink. It is possible to arrange multiple slices of adjacently arranged volume elements one on top of another, i.e. print them one on top of another. The two-dimensional extent and the number of slices to be printed one on top of another depends on the desired dimensions of component B of the spectacle lens of the disclosure to be printed. The individual slices can be cured in slices, typically by means of UV light, until reaction of the radiation-curable component is complete. Alternatively, the printing of each slice may be followed by incomplete curing, and the printing of all slices may be followed by final curing, typically by means of UV light in each case.

The printer, especially 3D printer, comprises at least one printhead which, by the drop-on-demand method known from inkjet printing, produces volume elements by means of a piezoelectric element and only ever positions a volume element exactly at the position where it is required. The at least one printhead can move across the ultrathin lens of component A or of component C and/or the ultrathin lens of component A or of component C may move beneath the at least one printhead. Typically, the 3D printing method used is multijet modeling or the polyjet method. The printhead used may, for example, be the Xaar 1001 printhead (from Xaar), one of the Spectra S-Class, Spectra SE3, Spectra SX3, Spectra Q-class printheads (from Spectra), the KM512 printhead (from Konica Minolta) and/or the 256Jet S4 printhead (from Trident). The resolution of the printhead is typically at least 300×300 dpi, further typically at least 600×600 dpi and more typically at least 1200×1200 dpi. Typically, at least one UV light source is mounted on at least one side of the printhead used; more typically, at least one UV light source is mounted on at least two sides of the printhead used. Alternatively, multiple printheads in parallel can be installed in a 3D printer and selectively actuated. The UV light source may then consist of multiple UV light sources likewise connected in parallel, or of few large UV light sources.

Component B of the spectacle lens of the disclosure that has been produced by means of a printing method, especially 3D printing method, may require at least one further mechanical processing step, for example polishing. Typically, component B of the spectacle lens of the disclosure that has been produced by means of a printing method, especially 3D printing method, does not require any further mechanical processing step, for example machining and/or grinding and/or turning and/or polishing.

In one exemplary embodiment of the disclosure, the spectacle lens of the disclosure comprising components A, B, and C may be configured without any optical correction effect. Component B here comprises a printing ink, typically a radiation-curable 3D printing ink, which, after curing, results in a component B material having uniform refractive index, i.e. having no refractive index distribution within component B. If each of components A and C comprises an ultrathin lens, component B can be constructed with the aid of a printing method, typically 3D printing method, either on the reverse face $R_{DA}$ of the ultrathin lens of component A or on the front face $V_{DC}$ of component C. Typically, component B is constructed by means of a printing method, typically 3D printing method, on the reverse face $R_{DA}$ of component A. If just one of components A and C comprises an ultrathin lens, component B may be constructed proceeding from the respective ultrathin lens by means of a printing method, typically 3D printing method. The respective other component C or A, in that case typically comprising a functional layer $F_C$ or $F_A$, may be applied to the front face $V_B$ or the reverse face $R_B$ of component B either likewise by means of a printing method, for example a 3D printing method, or by means of a spin-coating method. Alternatively, component B can also be constructed by means of a support structure corresponding to the negative mold of the front face $V_B$ or of the reverse face $R_B$ of component B, by means of a printing method, typically 3D printing method, bonded to one of the ultrathin lenses of component A and/or of component C and coated on that surface which does not comprise an ultrathin lens with one of the functional layers $F_C$ or $F_A$. If neither of components A and C comprises an ultrathin lens, component B is typically constructed by means of a support structure corresponding to the negative mold of the front face $V_B$ or of the reverse face $R_B$ of component B by means of a printing method, typically 3D printing method, and, after removing the support structure, subsequently coated on the front face $V_B$ with the functional layer $F_A$ and on the reverse face $R_B$ with the functional layer $F_C$, in each case by means of a printing method, for example 3D printing method, or by means of a spin-coating method.

In a further exemplary embodiment, the spectacle lens of the disclosure comprising components A, B, and C may be configured with an optical correction effect. Optical correction effect is understood to mean spherical correction, astigmatic correction and correction of the axis position and optionally correction by a prism with a base setting. This optical correction effect is conventionally implemented for distance vision in monofocal spectacle lenses. In the case of multifocal spectacle lenses, for example varifocal spectacle lenses or varifocal spectacle lenses, the optical correction effect for distance vision and/or for close vision may in each case include a spherical correction, an astigmatic correction, a correction of the axis position and optionally a correction by a prism with a base setting in the near-vision portion.

The optical correction effect and/or aberration correction for the viewing eye can typically be obtained by
 a suitable surface topography of the front face $V_{DA}$ of the ultrathin lens of component A and of the reverse face $R_{DC}$ of the ultrathin lens of component C in the spectacle lens of the disclosure, where component B has a uniform refractive index, i.e. no refractive index distribution;
 a suitable surface topography of the front face $V_B$ and of the reverse face $R_B$ of component B, where component A and component C do not comprise an ultrathin lens and component B has a uniform refractive index, i.e. no refractive index distribution;
 a defined surface topography of the front face $V_{DA}$ of the ultrathin lens of component A, a defined surface of the reverse face $R_{DC}$ of the ultrathin lens of component C, where the optical correction and/or the aberration correction of the viewing eye, in each case for distance vision and/or for close vision, in the spectacle lens of the disclosure results exclusively from a location-dependent calculated refractive index distribution within component B and the respective surface topographies of the front face $V_{DA}$ of the ultrathin lens of component A and of the reverse face $R_{DC}$ of the ultrathin lens of component C, the respective average thickness thereof and the respective refractive index thereof, and optionally the Abbe number thereof are taken into account in this calculation;
 a defined surface topography of the front face $V_{DA}$ of the ultrathin lens of component A, a defined surface topography of the reverse face $R_{DC}$ of the ultrathin lens of component C, where the optical correction and/or the aberration correction of the viewing eye, in each case for distance vision and/or for close vision, in the spectacle lens of the disclosure is based partly on a suitable surface topography of the front face $V_{DA}$ of the ultrathin lens of component A and/or of the reverse face $R_{DC}$ of the ultrathin lens of component C and partly on a location-dependent calculated refractive index distribution within component B;

a suitable surface topography of the front face $V_{DA}$ of the ultrathin lens of component A, a suitable surface topography of the reverse face $R_{DC}$ of the ultrathin lens of component C, where the optical correction for distance vision and/or the aberration correction of the viewing eye for distance vision in the spectacle lens of the disclosure is based on a calculated location-dependent refractive index distribution within component B and the optical correction for close vision and/or aberration correction of the viewing eye for close vision is achieved via a defined surface topography, which is taken into account in each case in the above calculation in addition to the refractive index of the ultrathin lens, of the front face $V_{DA}$ of the ultrathin lens of component A and/or reverse face of the ultrathin lens $R_{DC}$ of component C. Of course, the optical correction for distance vision and/or the aberration correction of the viewing eye for distance vision can also be effected via a defined surface topography of the front face $V_{DA}$ of the ultrathin lens of component A and/or of the reverse face $R_{DC}$ of the ultrathin lens of component C, and the optical correction for close vision and/or the aberration correction for close vision via a calculated location-dependent refractive index distribution within component B. In this case too, the calculation takes account of the surface topographies, the refractive indices and optionally the Abbe number of the ultrathin lens of component A and/or C.

If both component A and component C comprise an ultrathin lens, tables 1 and 2 below, by way of example, list some combinations of surface topographies of the ultrathin lenses for monofocal lenses and varifocal lenses. In the context of this disclosure, the surface topography of the front face $V_{DA}$ and of the reverse face $R_{DA}$ of the ultrathin lens of component A or of the front face $V_{DC}$ and of the reverse face $R_{DC}$ of the ultrathin lens of component C is the same in each case, and for that reason tables 1 and 2 below list only one surface topography in each case. In tables 1 and 2, the vertical column or the horizontal row may in each case describe the surface topography of the ultrathin lens of component A or of component C. It can also be inferred from the table whether a desired optical correction effect of the spectacle lens of the disclosure can be implemented by means of a component B having a uniform refractive index n or by means of a component B having a calculated location-dependent refractive index distribution $n_g$ within component B.

TABLE 1

Possible surface topographies for ultrathin lenses in monofocal spectacle lenses

|  | spherical | toric | aspherical | atoric | planar |
|---|---|---|---|---|---|
| spherical |  | n, $n_g$ | n, $n_g$ | n, $n_g$ | n, $n_g$ |
| toric | n, $n_g$ | n, $n_g$ | n, $n_g$ | n, $n_g$ | n, $n_g$ |

TABLE 1-continued

Possible surface topographies for ultrathin lenses in monofocal spectacle lenses

|  | spherical | toric | aspherical | atoric | planar |
|---|---|---|---|---|---|
| aspherical | n, $n_g$ | n, $n_g$ | n, $n_g$ | n, $n_g$ | n, $n_g$ |
| atoric | n, $n_g$ | n, $n_g$ | n, $n_g$ | n, $n_g$ | n, $n_g$ |
| planar | n, $n_g$ | n, $n_g$ | n, $n_g$ | n, $n_g$ | $n_g$ | n = uniform refractive index of component B
$n_g$ = location-dependent refractive index distribution within component B

TABLE 2

Possible surface topographies for ultrathin lenses in varifocal spectacle lenses

|  | spherical | toric | aspherical | atoric | progressive | planar |
|---|---|---|---|---|---|---|
| spherical | $n_g^{2)}$ | $n_g$ | $n_g$ | $n_g$ | n, $n_g$ | $n_g$ |
| toric | $n_g$ | $n_g$ | $n_g$ | $n_g$ | n, $n_g$ | $n_g$ |
| aspherical | $n_g$ | $n_g$ | $n_g$ | $n_g$ | n, $n_g$ | $n_g$ |
| atoric | $n_g$ | $n_g$ | $n_g$ | $n_g$ | n, $n_g$ | $n_g$ |
| progressive | $n^{1)}$, $n_g$ | n, $n_g$ | n, $n_g$ | n, $n_g$ | n, $n_g$ | n, $n_g$ |
| planar | $n_g$ | $n_g$ | $n_g$ | $n_g$ | n, $n_g$ | $n_g$ | n = uniform refractive index of component B
$n_g$ = location-dependent refractive index distribution within component B Typically, the calculations for location-dependent refractive index distribution within component B also take account of surface topography, refractive index, average thickness, and optionally the Abbe number of any ultrathin lens(es) present.

The location-dependent refractive index distribution within component B is typically optimized by means of optics computer programs, for example ZEMAX (from Zemax LLC). For the calculation, it is necessary with preference to know the position of the spectacle lens of the disclosure in front of the eye intended, the pupillary distance, the pantoscopic tilt of the spectacle lens, the face form angle of the spectacle lens, and the lens size. Furthermore, the calculation of multifocal lenses in particular is based on an object distance model which describes the position of object points in the spectacle wearer's field of view relative to the centers of rotation of the wearer's eyes.

Aberration correction for the viewing eye, regardless of whether the aberration correction is for close vision or distance vision, is typically calculated analogously to Werner Köppen "Konzeption and Entwicklung von Gleitsichtgläsern" [Design and Development of Varifocal Lenses], Deutsche Optiker Zeitschrift DOZ, October 1995, pages 42-45.

By means of location-dependent refractive index distribution, it is possible to achieve optical correction for close vision, for example, over a defined range with a defined refractive index within component B or by means of a location-dependent change in refractive index across a defined area within component B.

For the slice-by-slice construction of component B of the spectacle lens of the disclosure, preference is given to using a printing ink usable in a 3D printing method. "Slice-by-slice construction" comprises successive deposition of the printing ink, typically 3D printing ink. The successive deposition can be effected here either adjacently in an area or in a vertically superposed manner. If, for example, a first deposition of the printing ink, typically 3D printing ink, is effected in an area on the ultrathin lens of component A or C, a further slice can be printed over the complete area of the first deposition or part of the area of the first deposition. Typically, the successive deposition of the printing ink, typically 3D printing ink, is first effected adjacently in an area before being followed by a further successive deposition of the printing ink, typically 3D printing ink, in the slice above.

The printing ink, especially 3D printing ink, typically comprises at least one radiation-curable component, optionally at least one colorant, optionally at least one UV initiator, optionally at least one solvent and optionally at least one additive.

The radiation-curable component of the printing ink, especially 3D printing ink, typically UV-curable component, typically comprises (meth)acrylate monomers, epoxy monomers, vinyl monomers and allyl monomers, more typically (meth)acrylate monomers. The (meth)acrylate monomers may typically be monofunctional, difunctional, trifunctional and/or tetrafunctional (meth)acrylate monomers. The epoxy monomers may typically be monofunctional, difunctional, trifunctional and/or tetrafunctional epoxy monomers. The vinyl monomers and allyl monomers may typically be monofunctional, difunctional, trifunctional and/or tetrafunctional vinyl monomers and allyl monomers.

In one exemplary embodiment, the monofunctional (meth)acrylate monomers, epoxy monomers, vinyl monomers and allyl monomers usable as radiation-curable component, typically UV-curable component, typically have a viscosity from a range from 0.5 mPa·s to 30.0 mPa·s, more typically from a range from 1.0 mPa·s to 25.0 mPa·s and most typically from a range from 1.5 mPa·s to 20.0 mPa·s.

In one exemplary embodiment, the difunctional (meth)acrylate monomers, epoxy monomers, vinyl monomers and allyl monomers usable as radiation-curable component, typically UV-curable component, typically have a viscosity from a range from 1.5 mPa·s to 17.0 mPa·s, more typically from a range from 2.5 mPa·s to 14.0 mPa·s and most typically from a range from 3.0 mPa·s to 11.0 mPa·s.

In one exemplary embodiment, the trifunctional (meth)acrylate monomers, epoxy monomers, vinyl monomers and allyl monomers usable as radiation-curable component, typically UV-curable component, typically have a viscosity from a range from 20.0 mPa·s to 110.0 mPa·s, more typically from a range from 22.0 mPa·s to 90.0 mPa·s and most typically from a range from 24.0 mPa·s to 83.0 mPa·s.

In one exemplary embodiment, the tetrafunctional (meth)acrylate monomers, epoxy monomers, vinyl monomers and allyl monomers usable as radiation-curable component, typically UV-curable component, typically have a viscosity from a range from 60.0 mPa·s to 600.0 mPa·s, more typically from a range from 70.0 mPa·s to 460.0 mPa·s and most typically from a range from 80.0 mPa·s to 270.0 mPa·s.

The viscosity of the (meth)acrylate monomers, epoxy monomers, vinyl monomers and allyl monomers is typically measured in each case with a Malvern C-VOR 150 rheometer with a specified angular velocity of 5.2 rad/sec at 25° C.

The respective (meth)acrylate monomers, epoxy monomers, vinyl monomers and allyl monomers can each be adjusted to the desired viscosity, for example, by addition of at least one solvent.

The viscosity of the printing ink, typically 3D printing ink, usable for construction of component B of the spectacle lens of the disclosure can be adjusted, for example, by mixing different (meth)acrylate monomers, epoxy monomers, vinyl monomers and/or allyl monomers, for example by mixing monofunctional (meth)acrylate monomers, epoxy monomers, vinyl monomers and/or allyl monomers and difunctional (meth)acrylate monomers, epoxy monomers, vinyl monomers and/or allyl monomers and/or trifunctional (meth)acrylate monomers, epoxy monomers, vinyl monomers and/or allyl monomers. Alternatively or additionally to the mixing of different (meth)acrylate monomers, epoxy monomers, vinyl monomers and/or allyl monomers, the viscosity can be adjusted by addition of at least one solvent.

Monofunctional (meth)acrylate monomers used may, for example, be acrylic acid (CAS No. 79-10-7), methacrylic acid (CAS No. 79-41-4), methyl acrylate (CAS No. 96-33-3), methyl methacrylate (CAS No. 80-62-6), ethyl acrylate (CAS No. 140-88-5), ethyl methacrylate (CAS No. 97-63-2), ethyl 2-ethylacrylate (CAS No. 3070-65-3), (2,2-dimethyl-1,3-dioxolan-4-yl)methyl methacrylate (CAS No. 7098-80-8), 2-phenoxyethyl acrylate (CAS No. 48145-04-6), isobornyl acrylate (CAS No. 5888-33-5), 2-(2-methoxyethoxy)ethyl methacrylate (CAS No. 45103-58-0), 4-acryloylmorpholine (CAS No. 5117-12-4), dodecyl acrylate (CAS No. 2156-97-0), isodecyl acrylate (CAS No. 1330-61-6), decyl acrylate (CAS No. 2156-96-9), n-octyl acrylate (CAS No. 2499-59-4), isooctyl acrylate (CAS No. 29590-42-9), octadecyl acrylate (CAS No. 4813-57-4), tetrahydrofurfuryl acrylate (CAS No. 2399-48-6), 2-(2-ethoxyethoxy) ethyl acrylate (CAS No. 7328-17-8), 4-tert-butylcyclohexyl acrylate (CAS No. 84100-23-2), methoxy poly(ethylene glycol) monoacrylate (CAS No. 32171-39-4), phenoxy polyethylene glycol acrylate (CAS No. 56641-05-5), mono-2-(acryloyloxy)ethyl succinate (CAS No. 50940-49-3), allyl methacrylate (CAS No. 96-05-9) or mixtures thereof.

Monofunctional (meth)acrylate monomers used are typically acrylic acid, methacrylic acid, methyl acrylate, methyl methacrylate, ethyl acrylate, ethyl methacrylate, 2-phenoxyethyl acrylate, dodecyl acrylate or mixtures thereof, more typically methacrylic acid, methyl methacrylate, ethyl methacrylate or mixtures thereof.

Difunctional (meth)acrylate monomers used may, for example, be ethylene glycol diacrylate (CAS No. 2274-11-5), diethylene glycol diacrylate (CAS No. 2274-11-5), triethylene glycol diacrylate (CAS No. 1680-21-3), tetraethylene glycol diacrylate (CAS No. 17831-71-9), ethylene glycol dimethacrylate (CAS No. 97-90-5), diethylene glycol dimethacrylate (CAS No. 2358-84-1), triethylene glycol dimethacrylate (CAS No. 109-16-0), tetraethylene glycol dimethacrylate (CAS No. 109-17-1), polyethylene glycol 200 dimethacrylate (CAS No. 25852-47-2), dipropylene glycol diacrylate (CAS No. 57472-68-1), tripropylene glycol diacrylate (CAS No. 42978-66-5), butane-1,3-diol diacrylate (CAS No. 19485-03-1), butane-1,4-diol diacrylate (CAS No. 1070-70-8), hexane-1,6-diol diacrylate (CAS No. 13048-33-4), neopentyl glycol diacrylate (CAS No. 2223-82-7), butane-1,3-diol dimethacrylate (CAS No. 1189-08-8), butane-1,4-diol dimethacrylate (CAS No. 2082-81-7), hexane-1,6-diol dimethacrylate (CAS No. 6606-59-3) or mixtures thereof.

Difunctional (meth)acrylate monomers used are typically polyethylene glycol 200 dimethacrylate, ethylene glycol dimethacrylate, diethylene glycol dimethacrylate, butane-1,4-diol dimethacrylate or mixtures thereof, more typically ethylene glycol dimethacrylate, diethylene glycol dimethacrylate or mixtures thereof.

Trifunctional (meth)acrylate monomers used may, for example, be trimethylolpropane trimethacrylate (CAS No. 3290-92-4), trimethylolpropane triacrylate (CAS No. 15625-89-5), pentaerythritol triacrylate (CAS No. 3524-68-3), pentaerythritol propoxylate triacrylate (CAS No. 145611-81-0), trimethylolpropane propoxylate triacrylate (CAS No. 53879-54-2), trimethylolpropane ethoxylate triacrylate (CAS No. 28961-43-5) or mixtures thereof.

Trifunctional (meth)acrylate monomers used with preference are trimethylolpropane trimethacrylate, pentaerythritol triacrylate or mixtures thereof, more typically trimethylolpropane trimethacrylate.

Tetrafunctional (meth)acrylate monomers used may, for example, be di(trimethylolpropane) tetraacrylate (CAS No. 94108-97-1), pentaerythritol tetraacrylate (CAS No. 4986-89-4), pentaerythritol tetramethacrylate (CAS No. 3253-41-6) or mixtures thereof.

Tetrafunctional (meth)acrylate monomers used are typically di(trimethylolpropane) tetraacrylate, pentaerythritol tetramethacrylate or mixtures thereof, more typically di(trimethylolpropane) tetraacrylate.

Monofunctional epoxy monomers used may, for example, be ethyl glycidyl ether (CAS No. 4016-11-9), n-butyl glycidyl ether (CAS No. 2426-08-6), 2-ethylhexyl glycidyl ether (CAS No. 2461-15-6), C8-C10 glycidyl ether (CAS No. 68609-96-1), C12-C14 glycidyl ether (CAS No. 68609-97-2), cresyl glycidyl ether (CAS No. 2210-79-9), p-tert-butylphenyl glycidyl ether (CAS No. 3101-60-8), nonylphenyl glycidyl ether (CAS No. 147094-54-0), benzyl glycidyl ether (CAS No. 2930-05-4), phenyl glycidyl ether (CAS No. 122-60-1), bisphenol A 2,3-dihydroxypropyl glycidyl ether (CAS No. 76002-91-0) or mixtures thereof.

Monofunctional epoxy monomers used are typically ethyl glycidyl ether, n-butyl glycidyl ether, 2-ethylhexyl glycidyl ether or mixtures thereof, more typically ethyl glycidyl ether, n-butyl glycidyl ether or mixtures thereof.

Difunctional epoxy monomers used in the printing ink, typically 3D printing ink, usable for construction of component B may, for example, be diglycidyl ether (CAS No. 2238-07-5), ethylene glycol diglycidyl ether (CAS No. 2224-15-9), diethylene glycol diglycidyl ether (CAS No. 4206-61-5), propylene glycol diglycidyl ether (CAS No. 16096-30-3), dipropylene glycol diglycidyl ether (CAS No. 41638-13-5), butane-1,4-diol diglycidyl ether (CAS No. 2425-79-8), cyclohexane-1,4-dimethanol diglycidyl ether (CAS No. 14228-73-0), neopentyl glycol diglycidyl ether (CAS No. 17557-23-2), polypropylene glycol(400) diglycidyl ether (CAS No. 26142-30-3), hexane-1,6-diol diglycidyl ether (CAS No. 16096-31-4), bisphenol A diglycidyl ether (CAS No. 1675-54-3), bisphenol A propoxylate diglycidyl ether (CAS No. 106100-55-4), polyethylene glycol diglycidyl ether (CAS No. 72207-80-8), glycerol diglycidyl ether (CAS No. 27043-36-3), resorcinol diglycidyl ether (CAS No. 101-90-6) or mixtures thereof.

Difunctional epoxy monomers used are typically diglycidyl ether, ethylene glycol diglycidyl ether, diethylene glycol diglycidyl ether, butane-1,4-diol diglycidyl ether, polyethylene glycol diglycidyl ether, polypropylene glycol (400) diglycidyl ether or mixtures thereof, more typically ethylene glycol diglycidyl ether, diethylene glycol diglycidyl ether, butane-1,4-diol diglycidyl ether, polyethylene glycol diglycidyl ether or mixtures thereof.

Trifunctional epoxy monomers used may, for example, be trimethylolethane triglycidyl ether (CAS No. 68460-21-9), trimethylolpropane triglycidyl ether (CAS No. 30499-70-8), triphenylolmethane triglycidyl ether (CAS No. 66072-38-6), tris(2,3-epoxypropyl) isocyanurate (CAS No. 2451-62-9), tris(4-hydroxyphenyl)methane triglycidyl ether (CAS No. 66072-38-6), 1,1,1-tris(4-hydroxyphenyl)ethane triglycidyl ether (CAS No. 87093-13-8), glycerol triglycidyl ether (CAS No. 13236-02-7), glycerol propoxylate triglycidyl ether (CAS No. 37237-76-6), N,N-diglycidyl-4-glycidyloxyaniline (CAS No. 5026-74-4) or mixtures thereof.

Trifunctional epoxy monomers used are typically trimethylolpropane triglycidyl ether, tris(2,3-epoxypropyl) isocyanurate, glycerol triglycidyl ether, glycerol propoxylate triglycidyl ether or mixtures thereof, more typically tris(2,3-epoxypropyl) isocyanurate, glycerol triglycidyl ether or mixtures thereof.

Tetrafunctional epoxy monomers used may, for example, be pentaerythritol tetraglycidyl ether (CAS No. 3126-63-4), dipentaerythritol tetraglycidyl ether, tetraglycidylbenzylethane, sorbitol tetraglycidyl ether, tetraglycidyldiaminophenylmethane, tetraglycidylbisaminomethylcyclohexane or mixtures thereof.

Tetrafunctional epoxy monomers used are typically pentaerythritol tetraglycidyl ether (CAS No. 3126-63-4), dipentaerythritol tetraglycidyl ether, sorbitol tetraglycidyl ether or mixtures thereof, more typically pentaerythritol tetraglycidyl ether (CAS No. 3126-63-4), dipentaerythritol tetraglycidyl ether or mixtures thereof.

If the radiation-curable component of the printing ink, typically 3D printing ink, usable for construction of component B comprises monofunctional vinyl monomers, these may comprise, for example, ethylene glycol vinyl ether (CAS No. 764-48-7), di(ethylene glycol) vinyl ether (CAS No. 929-37-3), 1-vinylcyclohexanol (CAS No. 1940-19-8), vinyl acetate (CAS No. 108-05-4), vinyl chloride (CAS No. 75-01-4), ethyl vinyl ketone (CAS No. 1629-58-9), butyl vinyl ether (CAS No. 111-34-2), butane-1,4-diol vinyl ether (CAS No. 17832-28-9), vinyl acrylate (CAS No. 2177-18-6), vinyl methacrylate (CAS No. 4245-37-8), isobutyl vinyl ether (CAS No. 109-53-5), vinyl pivalate (CAS No. 3377-92-2), vinyl benzoate (CAS No. 769-78-8), vinyl valerate (CAS No. 5873-43-8), 2-ethylhexyl vinyl ether (CAS No. 103-44-6), phenyl vinyl ether (CAS No. 766-94-9), tert-butyl vinyl ether (CAS No. 926-02-3), cyclohexyl vinyl ether (CAS No. 2182-55-0), dodecyl vinyl ether (CAS No. 765-14-0), ethyl vinyl ether (CAS No. 109-92-2), propyl vinyl ether (CAS No. 764-47-6), cyclohexane-1,4-dimethanol vinyl ether (CAS No. 114651-37-5) or mixtures thereof.

Monofunctional vinyl monomers used are typically ethylene glycol vinyl ether, di(ethylene glycol) vinyl ether, ethyl vinyl ketone, vinyl acetate, phenyl vinyl ether, cyclohexyl vinyl ether or mixtures thereof, more typically ethyl vinyl ketone, vinyl acetate, ethylene glycol vinyl ether or mixtures thereof.

Difunctional vinyl monomers used may, for example, be di(ethylene glycol) divinyl ether (CAS No. 764-99-8), tri (ethylene glycol) divinyl ether (CAS No. 765-12-8), tetra (ethylene glycol) divinyl ether (CAS No. 83416-06-2), poly (ethylene glycol) divinyl ether (CAS No. 50856-26-3), tri (ethylene glycol) divinyl ether (CAS No. 765-12-8), divinylbenzene (CAS No. 1321-74-0), butane-1,4-diol divinyl ether (CAS No. 3891-33-6), hexane-1,6-diol divinyl ether (CAS No. 19763-13-4), cyclohexane-1,4-dimethanol divinyl ether (CAS No. 17351-75-6), 1,4-pentadien-3-ol (CAS No. 922-65-6) or mixtures thereof.

Difunctional vinyl monomers used as radiation-curable component in the printing ink, typically 3D printing ink, usable for construction of component B of the spectacle lens of the disclosure are typically di(ethylene glycol) divinyl ether, cyclohexane-1,4-dimethanol divinyl ether, poly(ethylene glycol) divinyl ether, divinylbenzene or mixtures thereof, more typically cyclohexane-1,4-dimethanol divinyl ether, divinylbenzene, di(ethylene glycol) divinyl ether or mixtures thereof.

Trifunctional or tetrafunctional vinyl monomers used may, for example, be 1,3,5-trivinylbenzene, 1,2,4-trivinylcyclohexane (CAS No. 2855-27-8), 1,3,5-trivinyl-1,3,5-triazinane-2,4,6-trione, 1,3,5-trivinyl-1,3,5-trimethylcyclotrisiloxane (CAS No. 3901-77-7), 2,4,6-trimethyl-2,4,6- trivinylcyclotrisilazane (CAS No. 5505-72-6), 2,4,6-trivinyl cyclotriboroxane pyridine complex (CAS No. 442850-89-7), tetravinylsilane (CAS No. 1112-55-6), 2,4,6,8-tetramethyl-2,4,6,8-tetravinylcyclotetrasiloxane (CAS No. 2554-06-5) or mixtures thereof.

Trifunctional or tetrafunctional vinyl monomers used are typically 1,3,5-trivinylbenzene, 1,2,4-trivinylcyclohexane, tetravinylsilane or mixtures thereof, more typically 1,3,5-trivinylbenzene, 1,2,4-trivinylcyclohexane or mixtures thereof.

In addition, the printing ink, typically 3D printing ink, usable for construction of component B of the spectacle lens of the disclosure may comprise monofunctional allyl monomers, for example allyl acetate (CAS No. 591-87-7), allyl acetoacetate (CAS No. 1118-84-9), allyl alcohol (CAS No. 107-18-6), allyl benzyl ether (CAS No. 14593-43-2), allyl butyl ether (CAS No. 3739-64-8), allyl butyrate (CAS No. 2051-78-7), allyl ethyl ether (CAS No. 557-31-3), ethylene glycol allyl ether (CAS No. 111-45-5), allyl phenyl ether (CAS No. 1746-13-0), trimethylolpropane allyl ether (CAS No. 682-11-1), 2-allyloxyethanol (CAS No. 111-45-5), 3-allyloxypropane-1,2-diol (CAS No. 123-34-2) or mixtures thereof.

Typically as monofunctional allyl monomers will comprise allyl acetate, allyl alcohol, ethylene glycol allyl ether, allyloxyethanol or mixtures thereof, more typically allyl acetate, allyl alcohol, ethylene glycol allyl ether or mixtures thereof.

Difunctional allyl monomers used may, for example, be allyl ether (CAS No. 557-40-4), 2,2'-diallylbisphenol A (CAS No. 1745-89-7), 2,2'-diallylbisphenol A diacetate ether (CAS No. 1071466-61-9), trimethylolpropane diallyl ether (CAS No. 682-09-7), diallyl carbonate (CAS No. 15022-08-9), diallyl maleate (CAS No. 999-21-3), diallyl succinate (CAS No. 925-16-6), diallyl phthalate (CAS No. 131-17-9), di(ethylene glycol) bis(allylcarbonate) (CAS No. 142-22-3) or mixtures thereof.

Difunctional allyl monomers used are typically allyl ether, 2,2'-diallylbisphenol A, diallyl carbonate, diallyl succinate, di(ethylene glycol) bis(allylcarbonate), diallyl maleate or mixtures thereof, more typically allyl ether, 2,2'-diallylbisphenol A, diallyl carbonate, diethylene glycol diallyl carbonate or mixtures thereof.

Trifunctional or tetrafunctional allyl monomers used may, for example, be 2,4,6-triallyloxy-1,3,5-triazine (CAS No. 101-37-1), 1,3,5-triallyl-1,3,5-triazine-2,4,6(1H,3H,5H)-trione (CAS No. 1025-15-6), 3-(N,N',N'-triallylhydrazine)propionic acid, pentaerythritol allyl ether (CAS No. 91648-24-7), 1,1,2,2-tetraallyloxyethane (CAS No. 16646-44-9), tetraallyl pyromellitate (CAS No. 13360-98-0) or mixtures thereof.

Trifunctional or tetrafunctional allyl monomers used are typically 2,4,6-triallyloxy-1,3,5-triazine, pentaerythritol allyl ether, 1,3,5-triallyl-1,3,5-triazine-2,4,6(1H,3H,5H)-trione or mixtures thereof, more typically 2,4,6-triallyloxy-1,3,5-triazine, pentaerythritol allyl ether or mixtures thereof.

The selection of radiation-curing components to be used is typically made in such a way that sufficiently crosslinkable but nevertheless rapidly curing monomer mixtures can be obtained.

The total proportion of at least one radiation-curable component in the printing ink, typically 3D printing ink, usable for construction of component B of the spectacle lens of the disclosure is typically within a range from 11.0% by weight to 99.5% by weight, further typically within a range from 17% by weight to 99% by weight, more typically within a range from 31% by weight to 98.5% by weight and most typically within a range from 40% by weight to 98% by weight, based in each case on the total weight of the printing ink, typically 3D printing ink. The above-listed ranges are applicable both to the use of exclusively monofunctional, exclusively difunctional, exclusively trifunctional, exclusively tetrafunctional radiation-curable components and to the use of mixtures of radiation-curable components selected from the group consisting of monofunctional, difunctional, trifunctional and tetrafunctional radiation-curable components. The above-listed ranges are also applicable both to the use of exclusively (meth)acrylate monomers, epoxy monomers, vinyl monomers or allyl monomers and to the use of mixtures thereof. For example, at least one monofunctional (meth)acrylate monomer may be present in a mixture with at least one trifunctional epoxy monomer.

The total proportion of at least one kind of monofunctional (meth)acrylate monomer, epoxy monomer, vinyl monomer or allyl monomer in the printing ink, typically 3D printing ink, usable for construction of component B of the spectacle lens of the disclosure is typically within a range from 0.0% by weight to 60.0% by weight, further typically within a range from 0.3% by weight to 51.0% by weight, more typically within a range from 1.2% by weight to 44.0% by weight and most typically within a range from 1.8% by weight to 35.0% by weight, based in each case on the total weight of the printing ink, typically 3D printing ink. The aforementioned ranges are applicable both to the use of one kind of monofunctional (meth)acrylate monomer, epoxy monomer, vinyl monomer or allyl monomer and to the use of a mixture of different monofunctional (meth)acrylate monomers, epoxy monomers, vinyl monomers or allyl monomers. For example, at least one kind of monofunctional (meth)acrylate monomer may be present in a mixture in each case with at least one kind of monofunctional allyl monomer, or at least one kind of monofunctional (meth)acrylate monomer with at least one different kind of monofunctional (meth)acrylate monomer.

In an exemplary embodiment, the printing ink, typically 3D printing ink, usable for construction of component B of the spectacle lens of the disclosure does not comprise any monofunctional (meth)acrylate monomer, epoxy monomer, vinyl monomer or allyl monomer.

The total proportion of at least one kind of difunctional (meth)acrylate monomer, epoxy monomer, vinyl monomer or allyl monomer in the printing ink, typically 3D printing ink, usable for construction of component B of the spectacle lens of the disclosure is typically within a range from 32.0% by weight to 99.0% by weight, further typically within a range from 39.0% by weight to 97.0% by weight, more typically within a range from 47.0% by weight to 95.0% by weight and most typically within a range from 56.0% by weight to 93.0% by weight, based in each case on the total weight of the printing ink, typically 3D printing ink. The aforementioned ranges are applicable both to the use of one kind of difunctional (meth)acrylate monomer, epoxy monomer, vinyl monomer or allyl monomer and to the use of a mixture of different difunctional (meth)acrylate monomers, epoxy monomers, vinyl monomers or allyl monomers. For example, at least one kind of difunctional (meth)acrylate monomer may be present in a mixture with at least one kind of difunctional epoxy monomer, or there may be a mixture of two different kinds of monofunctional (meth)acrylate monomers.

The total proportion of at least one kind of trifunctional (meth)acrylate monomer, epoxy monomer, vinyl monomer or allyl monomer in the printing ink, typically 3D printing ink, usable for construction of component B of the spectacle lens of the disclosure is typically within a range from 1.0% by weight to 51.0% by weight, further typically within a range from 2.0% by weight to 43.0% by weight, more typically within a range from 3.0% by weight to 36.0% by weight and most typically within a range from 4.0% by weight to 31.0% by weight, based in each case on the total weight of the printing ink, typically 3D printing ink. The aforementioned ranges are applicable both to the use of one kind of trifunctional (meth)acrylate monomer, epoxy monomer, vinyl monomer or allyl monomer and to the use of a mixture of different trifunctional (meth)acrylate monomers, epoxy monomers, vinyl monomers or allyl monomers. For example, at least one kind of trifunctional (meth)acrylate monomer may be present in a mixture in each case with at least one kind of trifunctional vinyl monomer, or at least one kind of trifunctional (meth)acrylate monomer with at least one different kind of trifunctional (meth)acrylate monomer.

The total proportion of at least one kind of tetrafunctional (meth)acrylate monomer, epoxy monomer, vinyl monomer or allyl monomer in the printing ink, typically 3D printing ink, usable for construction of component B of the spectacle lens of the disclosure is typically within a range from 0% by weight to 16% by weight, further typically within a range from 0% to 13% by weight, more typically within a range from 0.1% by weight to 9% by weight and most typically within a range from 0.4% by weight to 4% by weight, based in each case on the total weight of the printing ink, typically 3D printing ink. The aforementioned ranges are applicable both to the use of one kind of tetrafunctional (meth)acrylate monomer, epoxy monomer, vinyl monomer or allyl monomer and to the use of a mixture of different tetrafunctional (meth)acrylate monomers, epoxy monomers, vinyl monomers or allyl monomers. For example, at least one kind of tetrafunctional (meth)acrylate monomer may be present in a mixture with at least one other, different kind of tetrafunctional (meth)acrylate monomer, or there may be a mixture of at least one kind of tetrafunctional (meth)acrylate monomer with at least one kind of tetrafunctional allyl monomer.

In an exemplary embodiment, the printing ink, typically 3D printing ink, usable for construction of component B of the spectacle lens of the disclosure comprises at least one monofunctional radiation-curable component and at least one difunctional radiation-curable component typically in a weight ratio of 1:1, more typically in a weight ratio of 1:5 and most typically in a weight ratio of 1:10.

In a further exemplary embodiment, the printing ink, typically 3D printing ink, usable for construction of component B of the spectacle lens of the disclosure comprises at least one monofunctional radiation-curable component and at least one trifunctional radiation-curable component typically in a weight ratio of 1:5, more typically in a weight ratio of 1:3 and most typically in a weight ratio of 1:1.

In a further exemplary embodiment, the printing ink, typically 3D printing ink, usable for construction of component B of the spectacle lens of the disclosure comprises at least one difunctional radiation-curable component and at least one trifunctional radiation-curable component in a weight ratio of 1:1, more typically in a weight ratio of 5:1 and most typically in a weight ratio of 8:1.

In a further exemplary embodiment, the printing ink, typically 3D printing ink, usable for construction of component B of the spectacle lens of the disclosure comprises at least one difunctional radiation-curable component and at least one tetrafunctional radiation-curable component in a weight ratio of 5:1, more typically in a weight ratio of 10:1 and most typically in a weight ratio of 20:1.

In a further exemplary embodiment, the printing ink, typically 3D printing ink, usable for construction of component B of the spectacle lens of the disclosure comprises at least one monofunctional radiation-curable component and at least one difunctional radiation-curable component and at least one trifunctional radiation-curable component in a weight ratio of 1:5:1, more typically in a weight ratio of 2:13:0.5 and most typically in a weight ratio of 2:18:0.3.

In a typical exemplary embodiment, the printing ink, typically 3D printing ink, usable for construction of component B of the spectacle lens of the disclosure comprises, as radiation-curable component, at least one kind of difunctional (meth)acrylate monomer and at least one kind of trifunctional (meth)acrylate monomer, where the viscosity of the printing ink, typically 3D printing ink, of the disclosure is <50 mPa·s, typically within a range from 5 mPa·s to 33 mPa·s, further typically within a range from 7 mPa·s to 27 mPa·s, more typically within a range from 9 mPa·s to 23 mPa·s and most typically within a range from 11 mPa·s to 21 mPa·s.

In a further exemplary embodiment, the printing ink, typically 3D printing ink, usable for construction of component B of the spectacle lens of the disclosure comprises, as radiation-curable component, at least one kind of difunctional epoxy monomer and at least one kind of trifunctional epoxy monomer, where the viscosity of the printing ink, typically 3D printing ink, of the disclosure is <53 mPa·s, typically within a range from 4 mPa·s to 31 mPa·s, further typically within a range from 6 mPa·s to 28 mPa·s, more typically within a range from 9 mPa·s to 22 mPa·s and most typically within a range from 10 mPa·s to 20 mPa·s.

In one exemplary embodiment, the printing ink, typically 3D printing ink, usable for construction of component B of the spectacle lens of the disclosure comprises at least one UV initiator. The printing ink, typically 3D printing ink, of the disclosure may comprise, for example, benzophenone (CAS No. 119-61-9), 2-methylbenzophenone (CAS No. 131-58-8), 4-methylbenzophenone (CAS No. 134-84-9), 4,4'-bis(dimethylamino)benzophenone (CAS No. 90-94-8), benzoin (CAS No. 119-53-9), benzoin methyl ether (CAS No. 3524-62-7), benzoin isopropyl ether (CAS No. 6652-28-4), 2,2-dimethoxy-1,2-diphenylethan-1-one (CAS No. 24650-42-8), phenylbis(2,4,6-trimethylbenzoyl)phosphine oxide (CAS No. 162881-26-7), ethyl 2,4,6-trimethylbenzoylphenylphosphinate (CAS No. 84434-11-7), 2-methyl-1-[4-(methylthio)phenyl]-2-(4-morpholinyl)-1-propanone (CAS No. 71868-10-5), 2-hydroxy-2-methyl-1-phenyl-1-propanone (CAS No. 7473-98-5), 2-(dimethylamino)-1-(4-(4-morpholinyl)phenyl)-2-(phenylmethyl)-1-butanone (CAS No. 119313-12-1), diphenyl(2,4,6-trimethylbenzoyl)phosphine oxide (CAS No. 75980-60-8), triarylsulfonium hexafluorophosphate salts (CAS No. 109037-77-6), triarylsulfonium hexafluoroantimonate salts (CAS No. 109037-75-4) or mixtures thereof as UV initiator. The printing ink, typically 3D printing ink, of the disclosure typically comprises benzophenone, 2,2-dimethoxy-1,2-diphenylethan-1-one, phenylbis(2,4,6-trimethylbenzoyl)phosphine oxide, diphenyl(2,4,6-trimethylbenzoyl)phosphine oxide, triarylsulfonium hexafluorophosphate salts or mixtures thereof, more typically 2,2-dimethoxy-1,2-diphenylethan-1-one, phenylbis(2,4,6-trimethylbenzoyl)phosphine oxide, diphenyl(2,4,6-trimethylbenzoyl)phosphine oxide or mixtures thereof as UV initiator.

The printing ink, typically 3D printing ink, usable for construction of component B of the spectacle lens of the disclosure comprises the at least one UV initiator in a total proportion from a range from typically 0.01% by weight to 3.7% by weight, more typically from a range from 0.1% by weight to 2.1% by weight and most typically from a range from 0.3% by weight to 1.7% by weight, based in each case on the total weight of the printing ink, typically 3D printing ink.

In one exemplary embodiment, the at least one UV initiator may be used together with a co-initiator. Co-initiators are typically added whenever the UV initiator requires a second molecule to form a free radical active in the UV range. For example, benzophenone requires a second molecule, for example an amine, e.g. triethylamine, methyldiethanolamine or triethanolamine, in order to produce a free radical after absorption of UV light.

The optionally at least one solvent in the printing ink, typically 3D printing ink, usable for construction of component B of the spectacle lens of the disclosure may be selected from the group consisting of alcohols, ketones, esters, ethers, thioethers, amides, hydrocarbons, amines and mixtures thereof. Typically, the optionally at least one solvent is selected from the group consisting of alcohols, ketones, esters and mixtures thereof. In the context of this disclosure, a solvent may firstly be one kind of solvent, and secondly a solvent mixture.

Examples of alcohols usable as solvent are methanol, ethanol, propanol, isopropanol, butanol, pentanol, hexanol or mixtures thereof.

Examples of solvents usable as ketones are acetone, methyl ethyl ketone, cyclohexanone, diisobutyl ketone, methyl propyl ketone, diacetone alcohol or mixtures thereof.

Examples of esters as usable solvents are methyl acetate, ethyl acetate, 1-methoxy-2-propyl acetate, n-propyl acetate, i-propyl acetate, ethoxypropyl acetate, butyl acetate, methyl propionate, ethyl propionate, glycol ether acetates, butyl glycol acetate, propylene glycol diacetate, ethyl lactate or mixtures thereof.

Examples of ethers as usable solvents are diethyl ether, dipropyl ether, tetrahydrofuran, ethylene glycol ethyl ether, ethylene glycol methyl ether, triethylene glycol butyl ether, tetraethylene glycol methyl ether, tetraethylene glycol butyl ether, dipropylene glycol dimethyl ether, propylene glycol butyl ether, 1-methoxy-2-propanol, 3-methoxy-3-methyl-1-butanol or mixtures thereof.

Examples of amides as usable solvents are dimethylacetamide, dimethylformamide, formamide, N-methylformamide, N-methylpyrrolidone and 2-pyrrolidone.

Examples of hydrocarbons as usable solvents are terpenes, such as pinene, limonene or terpinolene, aliphatic hydrocarbons such as hexane, heptane, octane or petroleum spirit, aromatic hydrocarbons such as toluene or xylene.

In one exemplary embodiment, the optionally at least one solvent in the printing ink, especially 3D printing ink, usable for construction of component B of the spectacle lens of the disclosure is selected from the group consisting of isopropanol, ethanol, butanol, diisobutyl ketone, butylglycol, butylglycol acetate, propylene glycol diacetate, dipropylene glycol dimethyl ether, ethyl lactate, ethoxypropyl acetate and mixtures thereof.

In one exemplary embodiment, the optionally at least one solvent has a flashpoint of at least 61° C.

In an exemplary embodiment, the proportion of the at least one solvent optionally present in the printing ink, typically 3D printing ink, usable for construction of component B of the spectacle lens of the disclosure is within a range from 0% by weight to 10% by weight, typically within a range from 0% by weight to 7.7% by weight, more typically within a range from 0.1% by weight to 6.3% by weight and most typically within a range from 0.1% by weight to 5.2% by weight, based in each case on the total weight of the printing ink, typically 3D printing ink. In a typical exemplary embodiment, the printing ink, typically 3D printing ink, usable for construction of component B of the spectacle lens of the disclosure does not comprise any solvent.

The printing ink, typically 3D printing ink, usable for construction of component B of the spectacle lens of the disclosure typically has a surface tension from a range from 10 mN/m to 80 mN/m, more typically from a range from 15 mN/m to 40 mN/m and most typically from a range from 18 mN/m to 35 mN/m. If the surface tension is below 10 mN/m, the droplets at the printhead become too large for the desired application. If the surface tension is above 80 mN/m, there is no formation of defined droplets of the printing ink at the printhead. Surface tension is typically determined at a temperature of 25° C. with the Krüss DSA 100 instrument and the pendant drop method.

The viscosity of the printing ink, typically 3D printing ink, usable for construction of component B of the spectacle lens of the disclosure is typically within a range from 4 mPa·s to 56 mPa·s, further typically within a range from 7 mPa·s to 45 mPa·s, more typically within a range from 9 mPa·s to 34 mPa·s and most typically within a range from 10 mPa·s to 22 mPa·s. Viscosity is typically measured with a Malvern C-VOR 150 rheometer with a specified angular velocity of 5.2 rad/sec at 25° C.

In one exemplary embodiment of the disclosure, the printing ink, typically 3D printing ink, usable for construction of component B of the spectacle lens of the disclosure may comprise at least one colorant. Colorants used may be chromatic or achromatic dyes that are soluble or dispersible in the surrounding medium. Depending on the effect to be achieved and/or on the visual impression to be achieved, colorants used, alternatively or additionally to the dyes, may also be pigments that are insoluble in the surrounding medium. Pigments used are typically effect pigments, such as metal effect pigments or pearlescent pigments, organic and/or inorganic pigments. The total proportion of colorant in the printing ink, typically 3D printing ink, usable for construction of component B of the spectacle lens of the disclosure is typically within a range from 0.0% by weight to 66.0% by weight, further typically within a range from 0.01% by weight to 53.1% by weight, more typically within a range from 0.1% by weight to 42.3% by weight and most typically within a range from 0.11% by weight to 27.7% by weight, based in each case on the total weight of the printing ink, typically 3D printing ink. The total proportion of colorant comprises the proportion of all colorants present in the printing ink, typically 3D printing ink, irrespective of whether they are dyes, pigments, mixtures thereof, mixtures of different dyes, mixtures of different pigments etc.

The printing ink, typically 3D printing ink, usable for construction of component B of the spectacle lens of the disclosure is typically produced by mixing all components while stirring, by initially charging the at least one colorant, if present, and first dissolving or dispersing it with a small amount of radiation-curable component and/or solvent and then adding the remaining components.

The printing ink, typically 3D printing ink, usable for construction of component B of the spectacle lens of the disclosure may additionally optionally comprise at least one additive. To the printing ink, typically 3D printing ink, may be added, for example, dispersants, antisettling agents, wetting agents, including anticrater or leveling additives, biocides, UV absorbers or mixtures thereof.

Dispersants help to achieve a homogeneous distribution of all solid constituents in the printing ink, typically 3D printing ink. More particularly, possible agglomeration of the pigments is avoided. Dispersants employed may, for example, be Solsperse 20000, Solsperse 32500, each from Avecia K.K., Disperbyk-102, Disperbyk-106, Disperbyk-111, Disperbyk-161, Disperbyk-162, Disperbyk-163, Disperbyk-164, Disperbyk-166, Disperbyk-180, Disperbyk-190, Disperbyk-191 or Disperbyk-192, each from Byk-Chemie GmbH.

Antisettling agents are intended to prevent settling-out, especially of pigments in the printing ink, typically 3D printing ink. Examples of usable antisettling agents are Byk-405 (from Byk-Chemie GmbH) in conjunction with fumed silicon dioxide, modified ureas such as Byk-410, Byk-411, or waxes such as Ceramat 250, Cerafak103, Cerafak 106 or Ceratix 8461, each from Byk-Chemie GmbH.

Wetting agents are important for the function of the printhead since internal structures such as ducts, filters, nozzle supply chambers etc. are also wetted. Examples of suitable wetting agents include fatty acid alkyl esters, acetylene derivatives, fluorinated esters or fluorinated polymers.

Biocides may be added to printing inks, typically 3D printing inks, in order to prevent growth of microorganisms. Biocides used may, for example, be polyhexamethylenebiguanides, isothiazolones, isothiazolinones, for example 5-chloro-2-methyl-4-isothiazolin-3-one, 2-methyl-4-isothiazolin-3-one or mixtures thereof.

The selection of the suitable UV absorber, which has to be compatible with the other components of the printing ink, especially 3D printing ink, and the 3D printing method, and the optimization of the concentration for achievement of a desired UV absorption property can be determined, for example, with the aid of simulation programs, taking account of suitable material databases.

DE 69534779 T2 discloses a selection of suitable UV absorbers for spectacle lenses which can also be used in the printing ink, typically 3D printing ink, usable for construction of component B of the spectacle lens of the disclosure. Accordingly, the UV absorber may comprise, for example, 2-(2'-hydroxy-5'-methylphenyl)benzotriazole, 2-hydroxy-4-n-acetoxybenzophenone, 2-(2'-hydroxy-5-octylphenyl)benzotriazole, 2-(2'-hydroxy-3',6'-(1,1-dimethylbenzylphenyl))benzotriazole, 2-(2'-hydroxy-3',5'-di-t-amylphenyl) benzotriazole, bis[2-hydroxy-5-methyl-3-(benzotriazol-2-yl)phenyl] methane, bis[2-hydroxy-5-t-octyl-3-(benzotriazol-2-yl)phenyl]methane, 2-hydroxy-4-(2-acryloyloxy-ethoxybenzophenone), 2-hydroxy-4-(2-hydroxy-3-methacryloyloxy)propoxybenzophenone, 2,2'-dihydroxy-4-methoxybenzophenone, 2,4-dihydroxybenzophenone, 2,2'-dihydroxy-4,4-dimethoxybenzophenone, 2,2',4,4'-tetrahydroxybenzophenone, ethyl 2-cyano-3,3-diphenylacrylate, 2-ethylhexyl 2-cyano-3,3-diphenylacrylate, 2',2',4-trihydroxybenzophenone, 2-hydroxy-4-acryloyloxy-ethoxybenzophenone (polymer), 2-hydroxy-4-acryloyloxyethoxybenzophenone, 4-hydroxy-4-methoxybenzophenone, 2-hydroxy-4-n-octoxybenzophenone or mixtures thereof.

Typically, the printing ink, typically 3D printing ink, usable for construction of component B of the spectacle lens of the disclosure comprises 2-(2'-hydroxy-5-octylphenyl) benzotriazole, 2-(2'-hydroxy-5'-methylphenyl)benzotriazole, 2-(2'-hydroxy-5-octylphenyl)benzotriazole, 2-hydroxy-4-(2-hydroxy-3-methacryloyloxy)propoxybenzophenone or mixtures thereof, more typically 2-(2'-hydroxy-5-octylphenyl)benzotriazole, 2(2'-hydroxy-5-octylphenyl)benzotriazole or mixtures thereof as UV absorber.

The total proportion of at least one UV absorber in the printing ink, typically UV printing ink, usable for construction of component B of the spectacle lens of the disclosure is typically within a range from 0.01% by weight to 5.1% by weight, more typically within a range from 0.07% by weight to 3.9% by weight and more typically within a range from 0.09% by weight to 3.1% by weight, based in each case on the total weight of the printing ink, typically 3D printing ink, of the disclosure. Aforementioned ranges relate both to the use of one UV absorber and to the use of a mixture of UV absorbers.

The total proportion of at least one additive in the printing ink, typically 3D printing ink, usable for construction of component B of the spectacle lens of the disclosure is typically within a range from 0.0% by weight to 10.0% by weight, more typically within a range from 0.01% by weight to 5.0% by weight and most typically within a range from 0.02% by weight to 3.0% by weight, based in each case on the total weight of the printing ink, typically 3D printing ink. The ranges mentioned are applicable to the use of one kind of additive, of a mixture of different kinds of additive and of a mixture of different additives from one kind of additive.

It is self-evident that the individual components of the printing ink, typically 3D printing ink, usable for construction of component B of the spectacle lens of the disclosure should be chosen such that their proportions do not add up to more than 100% by weight.

If a location-dependent refractive index distribution is calculated for component B, the refractive index of various printing inks, typically 3D printing inks, is ascertained by means of test series, typically after curing thereof.

The process for producing a spectacle lens comprising at least components A, B, and C comprises the following steps:
a) providing and optionally fixing the ultrathin lens of component A or C,
b) providing a three-dimensional model of component B,
c) digitally cutting the three-dimensional model from step b) into individual two-dimensional slices,
d) providing at least one printing ink, typically 3D printing ink, where the printing ink comprises at least one radiation-curable component,
e) constructing component B from the sum total of the individual two-dimensional slices from step c) by means of a printing operation on one of the ultrathin lenses of component A or C,
f) curing component B by means of UV light, wherein the curing can be effected fully or partially after each application of individual volume elements or after application of a slice of volume elements, and the partial curing can be completed on completion of the printing process,
g) optionally machining and/or grinding and/or turning and/or polishing the surface of component B obtained in step f) that does not adjoin one of the ultrathin lenses of component A or C,
h) h1) if the ultrathin lens of component A has been provided in step a): bonding the reverse face $R_B$ of component B of the spectacle lens obtained in step f) comprising components A and B to the front face $V_{DC}$ of the ultrathin lens of component C or coating the reverse face $R_B$ of component B with at least one functional layer $F_C$;
i) h2) if the ultrathin lens of component C has been provided in step a): bonding the front face $V_B$ of component B of the spectacle lens obtained in step f) comprising components B and C to the reverse face $R_{DA}$ of the ultrathin lens of component A or coating the front face $V_B$ of component B with at least a functional layer $F_A$, i) edging the spectacle lens obtained in step h) comprising components A, B, and C.

The bonding in step h) is typically cohesive and/or form-fitting by means of an adhesive or a bonding method. In the context of this disclosure, "cohesive bonds" are understood to mean bonds that hold the respective components of the spectacle lens of the disclosure together, typically components A and B or components B and C or components A and C. In the context of this disclosure, "form-fitting bonds" are understood to mean bonds in which the individual components of the spectacle lens of the disclosure, typically components A and B or components B and C or components A and C, can be joined together with an exact fit. Slight differences in the surface topography of the two surfaces to be joined to one another can be filled, for example, by means of an adhesive. In order to be able to bond the individual components of the spectacle lens of the disclosure to one another in a form-fitting manner, the radii of curvature of the respective components to be bonded to one another should typically differ by less than 1 mm, further typically within a range from 0.03 mm to ≤0.8 mm, more typically within a range from 0.04 mm to ≤0.7 mm and most typically within a range from 0.05 mm to ≤0.6 mm. Both cohesive and form-fitting bonds can be achieved, for example, by thermal treatment and/or by means of an adhesive.

The bonding in step h) is typically by means of an adhesive, more typically by means of an adhesive based on amine-catalyzed thiol hardening of epoxy resins to WO 2015/121341 A1. If the front faces and the reverse faces of components A, B, and C are each in spherical form but do not have identical radii of curvature at the interface between components A and B and/or at the interface between components B and C, the cavities that result from the differences in curvature on joining of the individual components are typically filled by means of an adhesive. For filling of cavities as well, preference is given to using an adhesive based on amine-catalyzed thiol hardening of epoxy resins according to WO 2015/121341 A1. Typically, nonidentical radii of curvature of the individual components differ by less than 1 mm, further typically within a range from 0.03 mm to ≤0.8 mm, more typically within a range from 0.04 mm to ≤0.7 mm and most typically within a range from 0.05 mm to ≤0.6 mm. Slight deviations in the radii of curvature can be exploited in that any air pockets that occur in the adhesive during the joining can be removed by simple pressing of the ultrathin lens of component A or C in the direction of the cylinder edge face of component B. If the interfaces of components A, B, and C are each in planar form, these may likewise be joined in a cohesive and form-fitting manner, for example by means of an adhesive or a bonding method.

The refractive index of the adhesive, typically an adhesive based on amine-catalyzed thiol hardening of epoxy resins, is typically matched to the directly adjoining component in each case. If component B has a uniform refractive index, the difference in refractive index between component B and the adjoining adhesive is typically not greater than 0.3, more typically not greater than 0.1 and most typically not greater than 0.05. If component B has a location-dependent refractive index distribution, the average refractive index of component B differs from the adjoining adhesive typically by not more than 0.3, more typically by not more than 0.1 and most typically by not more than 0.05.

The bonding in step h) may also be by means of a bonding method. The bonding method may be used alternatively or additionally to an adhesive for bonding in step h). For this purpose, the ultrathin lens of component A or the ultrathin lens of component C is heated typically up to the transformation temperature $T_G$ of the respective ultrathin lens, typically under a protective gas atmosphere, and contacted with the front face or reverse face of component B to be bonded in each case, for example by pressing the front face or the reverse face of component B into the heated ultrathin lens. Component B serves here firstly as mold shell for forming of the ultrathin lens; secondly, there is no need to use an adhesive in the bonding method. Typically, the thermal stress on component B is kept to a minimum by subjecting component B to a region that serves for heating of the ultrathin lens, for example an oven, for a very short period, typically less than 5 seconds, more typically less than 2 seconds. This brief thermal stress on component B does not bring about any change in the optically effective target face since the heat capacity of the ultrathin lens, in view of its small mass, is low compared to the mass of component B. In one exemplary embodiment, the surface of component B to be bonded can be protected with a more thermally stable protective layer. This may involve, for example, a coating composition as disclosed, for example, in EP 2 578 649 A1, especially in claim 1 of EP 2 578 649 A1, or a metal oxide, metal hydroxide, and/or metal oxide hydrate layer. The protective layer may also serve as a primer to compensate for differences in expansion.

In one exemplary embodiment of the disclosure, the last one to four, typically the last one to two, printed slices of component B of the spectacle lens of the disclosure are not cured. The ultrathin lens of component A or of component C may then be placed onto this surface comprising at least one uncured slice of component B. The bonding in step h) between components A and B or between components B and C can be effected in this case by means of UV exposure through the corresponding ultrathin lens, in which case component B can also be fully cured simultaneously. In this exemplary embodiment, it is possible to use a surface-activated ultrathin lens.

The printing, typically 3D printing, of component B of the spectacle lens of the disclosure commences with the provision of a three-dimensional model, typically CAD model. This three-dimensional model defines the three-dimensional geometry of the surface of component B not defined by the ultrathin lens of component A or C and, in combination of components A, B, and C, the volume of the spectacle lens.

In one exemplary embodiment of the disclosure, the application of the printing ink, especially 3D printing ink, does not end in the middle of the front face $V_B$ or of the reverse face $R_B$ of components B of the spectacle lens of the disclosure. Typically, the application of the printing ink, especially 3D printing ink, does not end within a circle having a radius of at least 10 mm, typically at least 15 mm, further typically at least 24 mm and more typically at least 32 mm from the distance vision point in the case of monofocal spectacle lenses and from the prism measurement point in the case of multifocal/varifocal spectacle lenses.

In one exemplary embodiment of the disclosure, the spectacle lens of the disclosure comprises at least one of components A, B, and C more than once. In this exemplary embodiment, the spectacle lens of the disclosure, proceeding from the object-side front face to the eye-side reverse face of the spectacle lens of the disclosure, may comprise, for example, components A, B, A', B', C. The above remarks relating to the bonding of the components of the spectacle lens of the disclosure may be applied correspondingly to the presence of further components in the spectacle lens of the disclosure.

BRIEF DESCRIPTION OF THE DRAWINGS

The disclosure will now be described with reference to the drawings wherein.

DESCRIPTION OF EXEMPLARY EMBODIMENTS

There follows a detailed elucidation of the disclosure by some examples, but these do not restrict the disclosure.

For each of the examples below:
1=front face $V_{DA}$ of the ultrathin lens of component A,
2=reverse face $R_{DA}$ of the ultrathin lens of component A=front face $V_B$ of component B,
3=reverse face $R_B$ of component B=front face $V_{DC}$ of the ultrathin lens of component C, and
4=reverse face $R_{DC}$ of the ultrathin lens of component C.

The thickness of face 4 describes the distance from the center of rotation of the eye.

Example 1

Calculation of a monofocal lens bounded by spherical surfaces with sph −4.0 D, in which a constant refractive index of $n_d$=1.523 has been used for the ultrathin lenses of components A and C. Component B was likewise based on a constant refractive index of $n_d$=1.523. Table 3 below illustrates the data of the spectacle lens-eye system.

TABLE 3

| | Radius of curvature [mm] | Thickness [mm] | $n_d$ | Diameter [mm] |
|---|---|---|---|---|
| 1 | 120.44 | 0.1 | 1.523 | 60 |
| 2 | 120.44 | 1.0 | 1.523 | 60 |
| 3 | 62.58 | 0.1 | 1.523 | 60 |
| 4 | 62.58 | 25[1)] | 1.0 | 60 |

Figure 1:
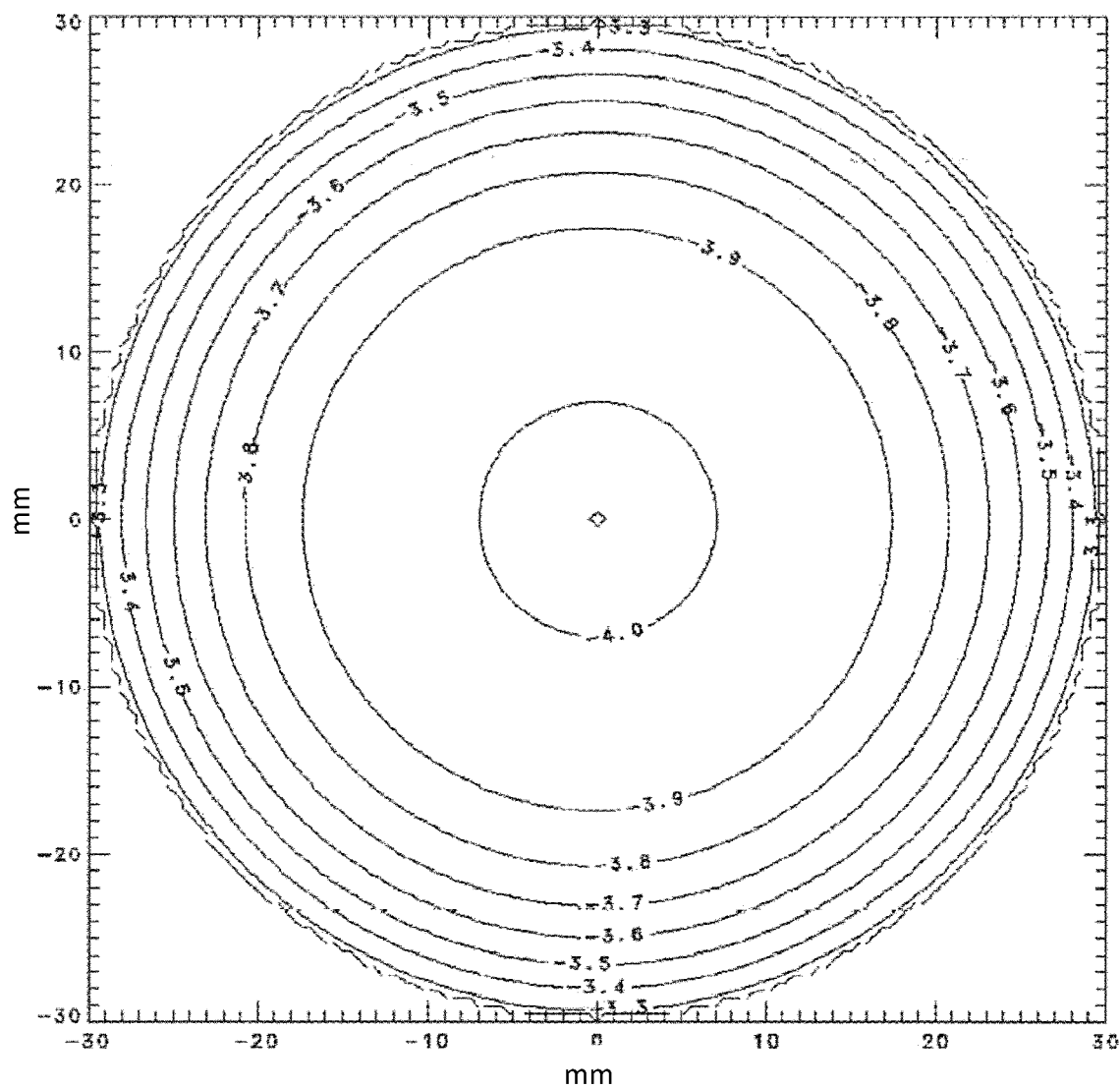
FIG. 1 shows the distribution of the average strength over the entire front face of a calculated spectacle lens according to a first exemplary embodiment.

FIG. 1 shows the distribution of the average strength for the viewing eye of the spectacle wearer over the entire front face of the calculated spectacle lens from example 1 in a diameter of 60 mm. The eye rotated here about the center of rotation of the eye. FIG. 1 also shows that the average strength of the spectacle lens changes from the middle toward the edge from sph −4.0 D to sph −3.2.

Figure 2:
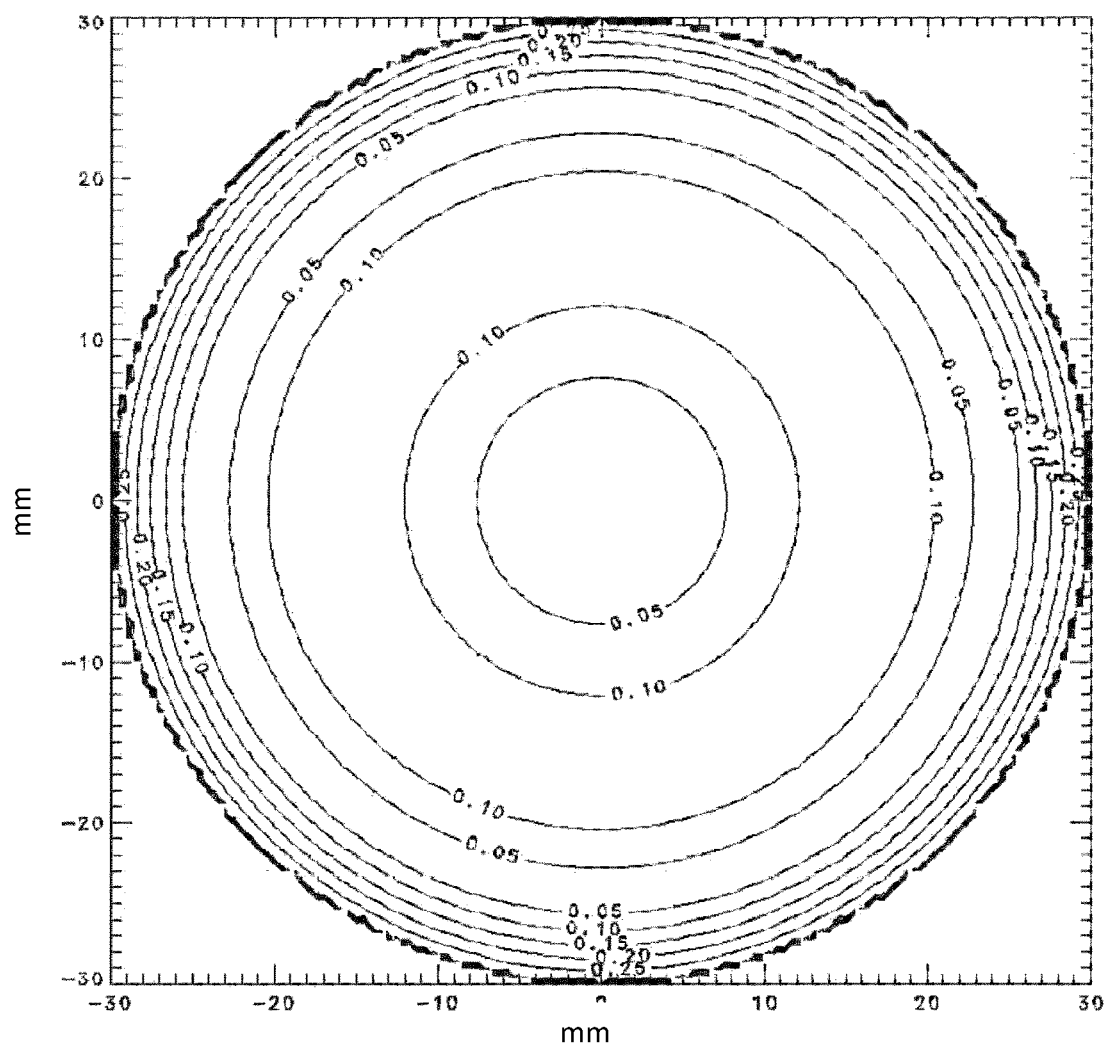
FIG. 2 shows the distribution of the astigmatic difference over the entire front face of a calculated spectacle lens according to a first exemplary embodiment.

FIG. 2 shows the distribution of the astigmatic difference for the viewing eye of the spectacle wearer over the entire front face of the calculated spectacle lens from example 1 in a diameter of 60 mm. Here too, the eye rotated about the center of rotation of the eye. FIG. 2 also shows that this astigmatic difference increases from the middle toward the edge from 0.0 D to 0.3 D.

Example 2

Calculation of a monofocal lens bounded by spherical surfaces with sph −4.5 D, in which a constant refractive index of $n_d$=1.523 has been used for the ultrathin lenses of components A and C. Component B was based on a location-dependent calculated refractive index distribution (in table 4 below: GRIN (gradient index)). Table 4 below illustrates the data of the spectacle lens-eye system.

TABLE 4

| | Radius of curvature [mm] | Thickness [mm] | $n_d$ | Diameter [mm] |
|---|---|---|---|---|
| 1 | 120.44 | 0.1 | 1.523 | 60 |
| 2 | 120.44 | 1.0 | GRIN | 60 |
| 3 | 62.58 | 0.1 | 1.523 | 60 |
| 4 | 62.58 | 25[1)] | 1.0 | 60 |

Figure 3:
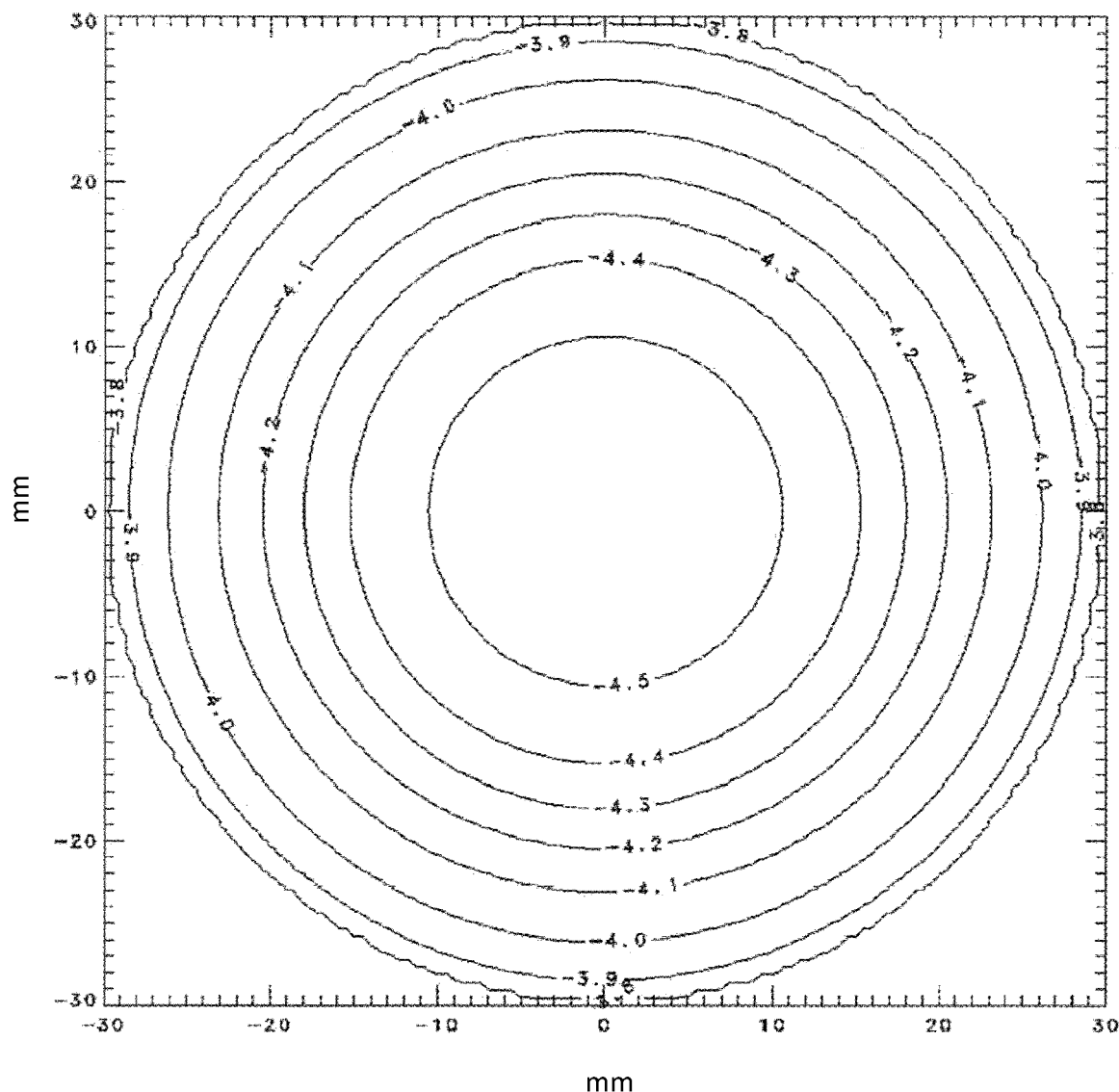
FIG. 3 shows the distribution of the average strength over the entire front face of a calculated spectacle lens according to a second exemplary embodiment.

FIG. 3 shows the distribution of the average strength for the viewing eye of the spectacle wearer over the entire front face of the calculated spectacle lens from example 2 in a diameter of 60 mm. The eye rotated here about the center of rotation of the eye. FIG. 3 also shows that the average strength of the spectacle lens changes from the middle toward the edge from sph −4.5 D to sph −3.8.

Figure 4:
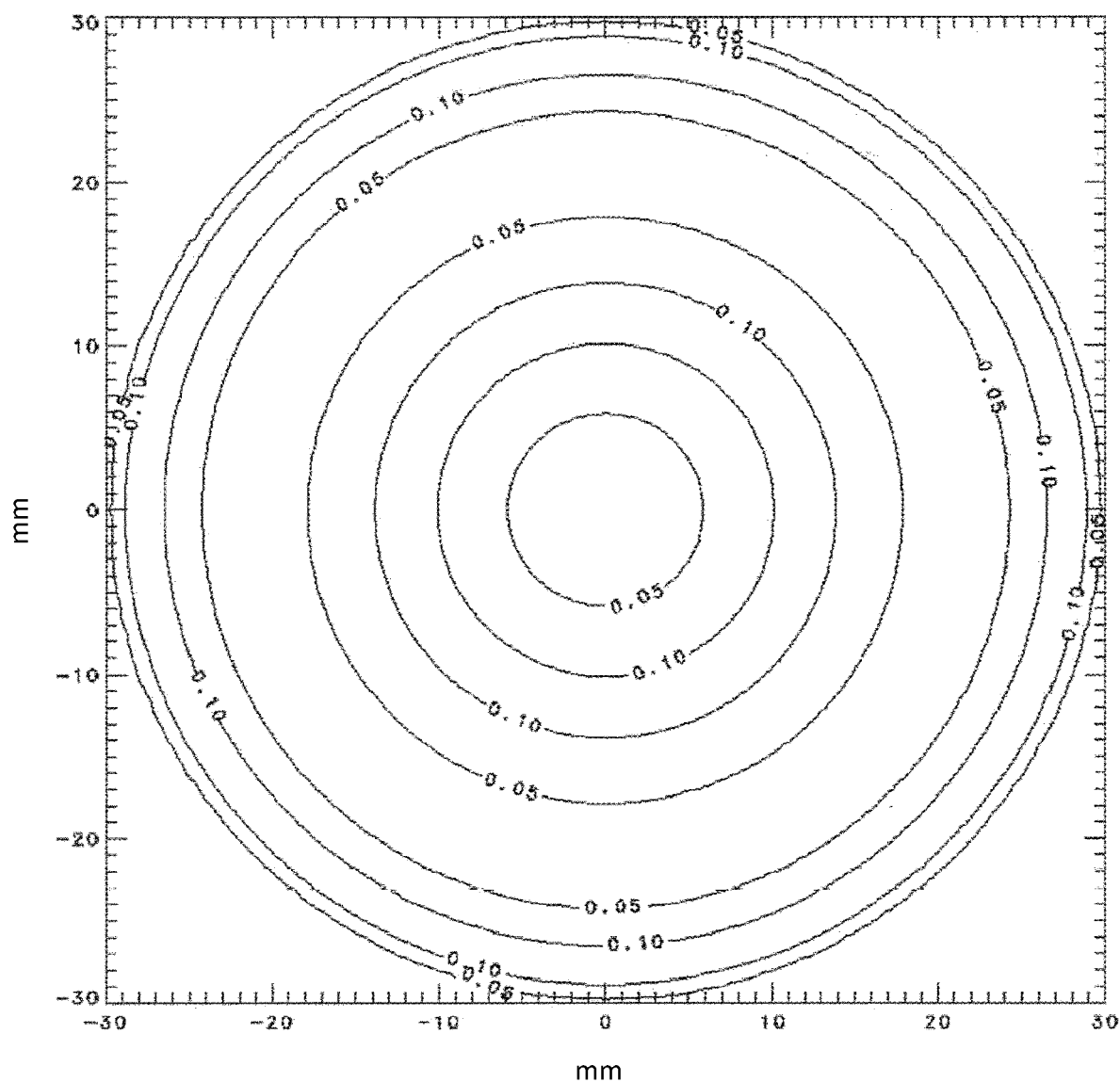
FIG. 4 shows the distribution of the astigmatic difference over the entire front face of a calculated spectacle lens according to a second exemplary embodiment.

FIG. 4 shows the distribution of the astigmatic difference for the viewing eye of the spectacle wearer over the entire front face of the calculated spectacle lens from example 2 in a diameter of 60 mm. Here too, the eye rotated about the center of rotation of the eye. FIG. 4 also shows that this astigmatic difference in the middle is 0.0 D. When looking to the side, the astigmatic difference reaches a maximum value of 0.12 D.

Figure 5:
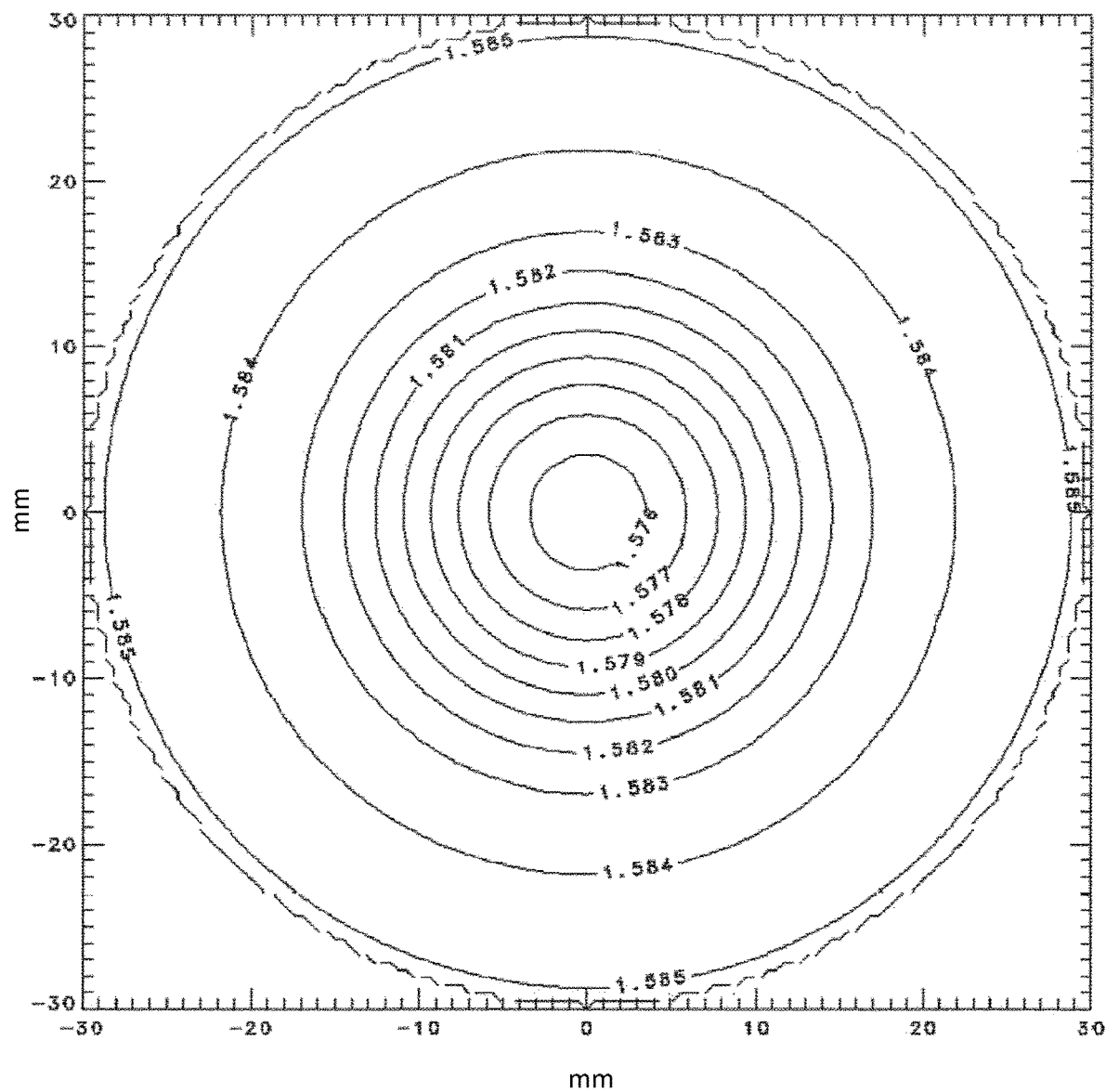
FIG. 5 shows the radial refractive index distribution within component B of a spectacle lens according to a second exemplary embodiment.

FIG. 5 shows the radial refractive index distribution within component B of the spectacle lens from example 2. The calculation of the radial refractive index distribution was based on the following formula: $n_d = 1.523 + c1 \cdot h^2 + c3 \cdot h^4 + c4 \cdot h^6 + c5 \cdot h^8$, with
c1=0.524136177·10$^{-1}$
c2=0.496881618·10$^{-4}$
c3=−0.108055871·10$^{-6}$ $c4=0.104110487 \cdot 10^{-9}$
$c5=-0.352329220 \cdot 10^{-13}$
where: $h^2=x^2+y^2$ (distance from the optical axis).

As can be inferred from the FIGS. corresponding to example 2, the use of a location-dependent calculated refractive index distribution (gradient index, GRIN) brings about a change in strength of the spectacle lens from example 2 and a change in optical correction for the viewing eye, even though there has been no change in the surface topography of the ultrathin lenses of components A and C.

Example 3

Calculation of a monofocal lens bounded by spherical surfaces with sph −4.4 D, in which a constant refractive index of $n_d=1.523$ has been used for the ultrathin lenses of components A and C. Component B was likewise based on a constant refractive index of $n_d=1.5754$. Table 5 below illustrates the data of the spectacle lens-eye system.

TABLE 5

| | Radius of curvature [mm] | Thickness [mm] | $n_d$ | Diameter [mm] |
|---|---|---|---|---|
| 1 | 120.44 | 0.1 | 1.523 | 60 |
| 2 | 120.44 | 1.0 | 1.5754 | 60 |
| 3 | 62.58 | 0.1 | 1.523 | 60 |
| 4 | 62.58 | 25[1)] | 1.0 | 60 |

Figure 6:
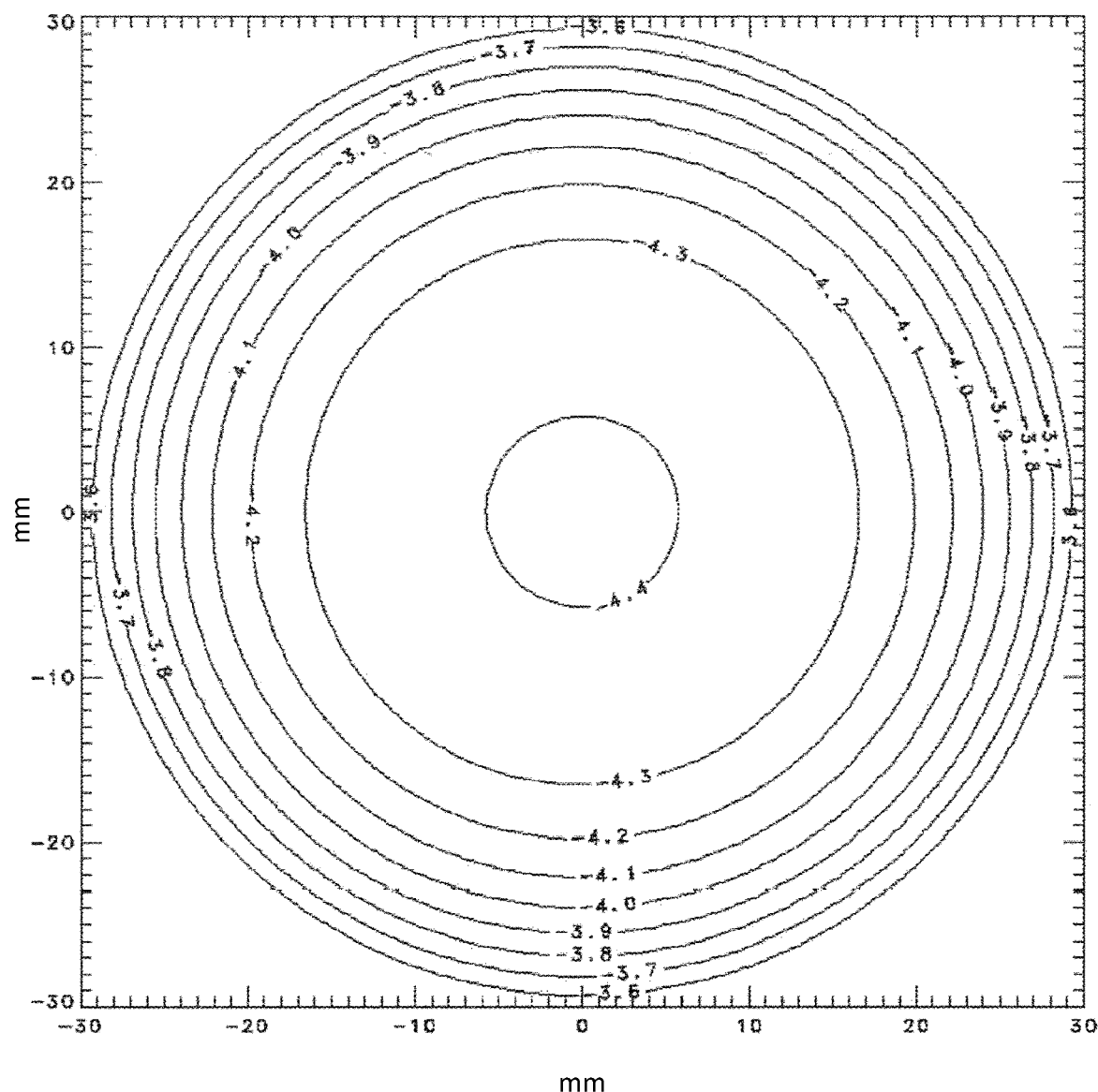
FIG. 6 shows the distribution of the average strength over the entire front face of a calculated spectacle lens from example 3 in a diameter of 60 mm according to a third exemplary embodiment.

FIG. 6 shows the distribution of the average strength for the viewing eye of the spectacle wearer over the entire front face of the calculated spectacle lens from example 3 in a diameter of 60 mm. The eye rotated here about the center of rotation of the eye. FIG. 6 also shows that the average strength of the spectacle lens changes from the middle toward the edge from sph −4.4 D to sph −3.6.

Figure 7:
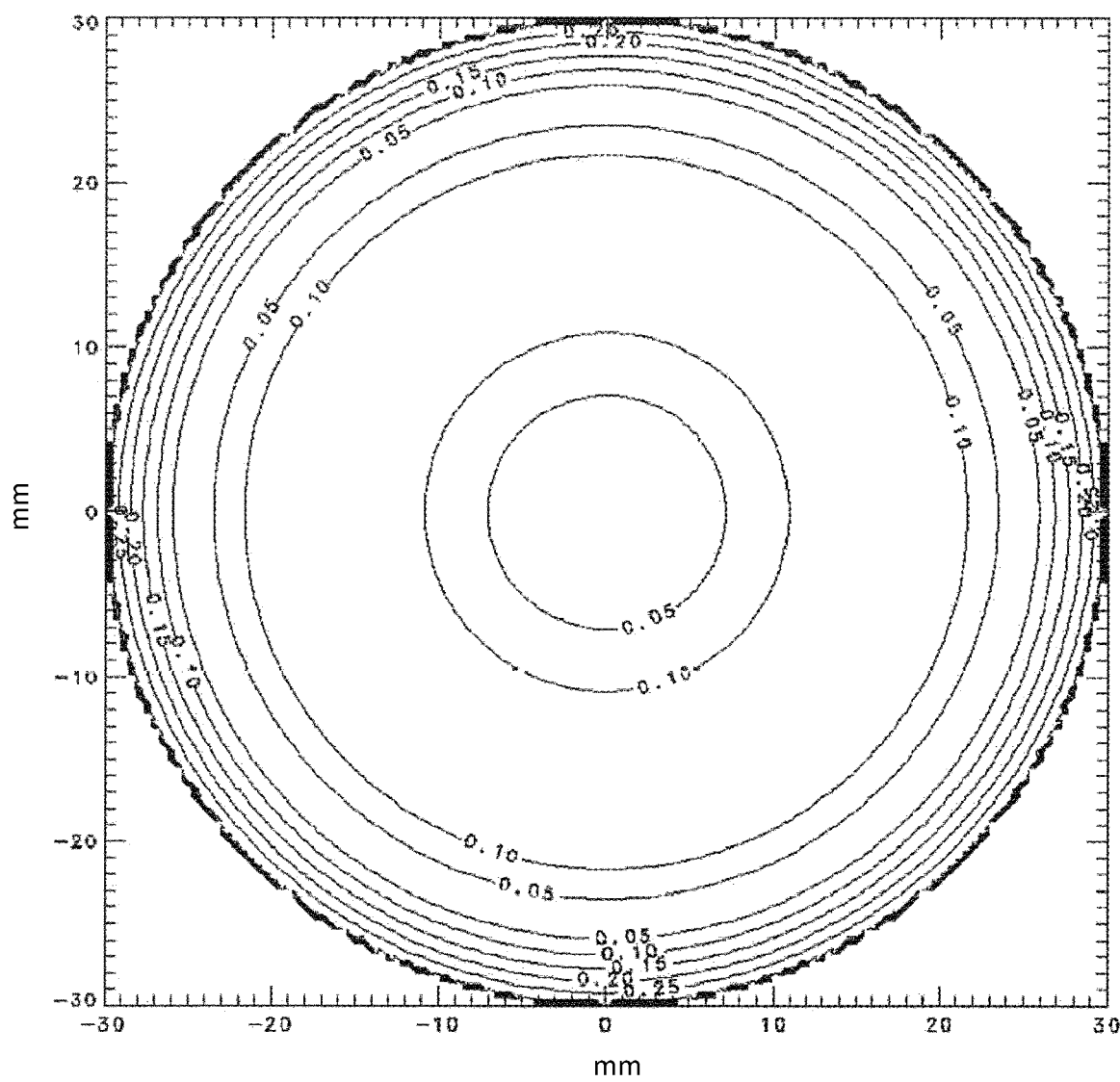
FIG. 7 shows the distribution of the astigmatic difference over the entire front face of a calculated spectacle lens according to a third exemplary embodiment.

FIG. 7 shows the distribution of the astigmatic difference for the viewing eye of the spectacle wearer over the entire front face of the calculated spectacle lens from example 3 in a diameter of 60 mm. Here too, the eye rotated about the center of rotation of the eye. FIG. 7 also shows that this astigmatic difference increases from the middle toward the edge from 0.0 D to 0.3 D.

Example 4

Calculation of a monofocal lens bounded by spherical surfaces with sph −4.0 D, in which a constant refractive index of $n_d=1.523$ has been used for the ultrathin lenses of components A and C. Component B was likewise based on a constant refractive index of $n_d=1.660$. Table 6 below illustrates the data of the spectacle lens-eye system.

TABLE 6

| | Radius of curvature [mm] | Thickness [mm] | $n_d$ | Diameter [mm] |
|---|---|---|---|---|
| 1 | 102.90 | 0.1 | 1.523 | 60 |
| 2 | 102.90 | 1.0 | 1.660 | 60 |
| 3 | 63.21 | 0.1 | 1.523 | 60 |
| 4 | 63.21 | 25[1)] | 1.0 | 60 |

Figure 8:
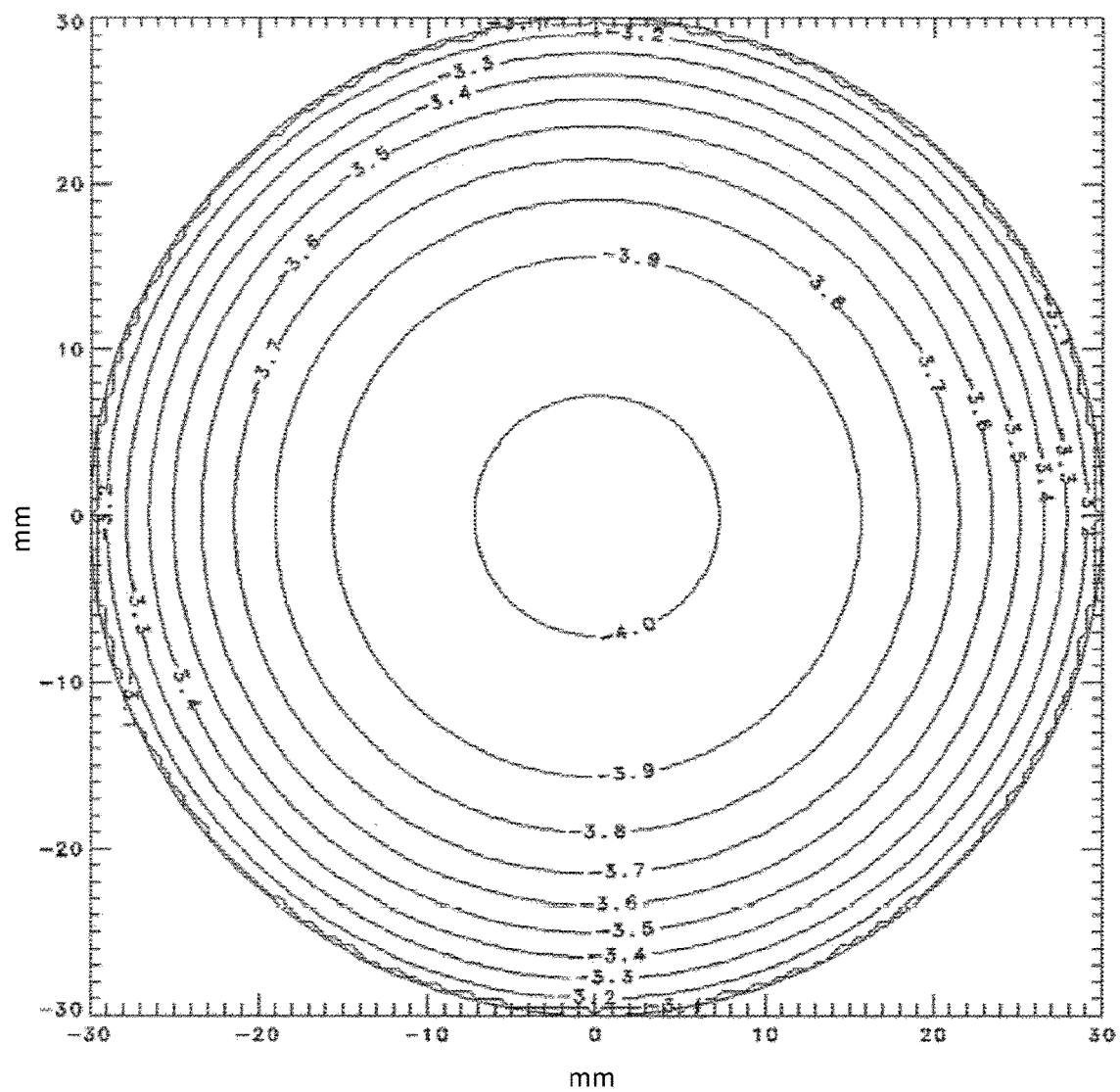
FIG. 8 shows the distribution of the average strength over the entire front face of a calculated spectacle lens according to a fourth exemplary embodiment.

FIG. 8 shows the distribution of the average strength for the viewing eye of the spectacle wearer over the entire front face of the calculated spectacle lens from example 4 in a diameter of 60 mm. The eye rotated here about the center of rotation of the eye. FIG. 8 also shows that the average strength of the spectacle lens changes from the middle toward the edge from sph −4.0 D to sph −3.1.

Figure 9:
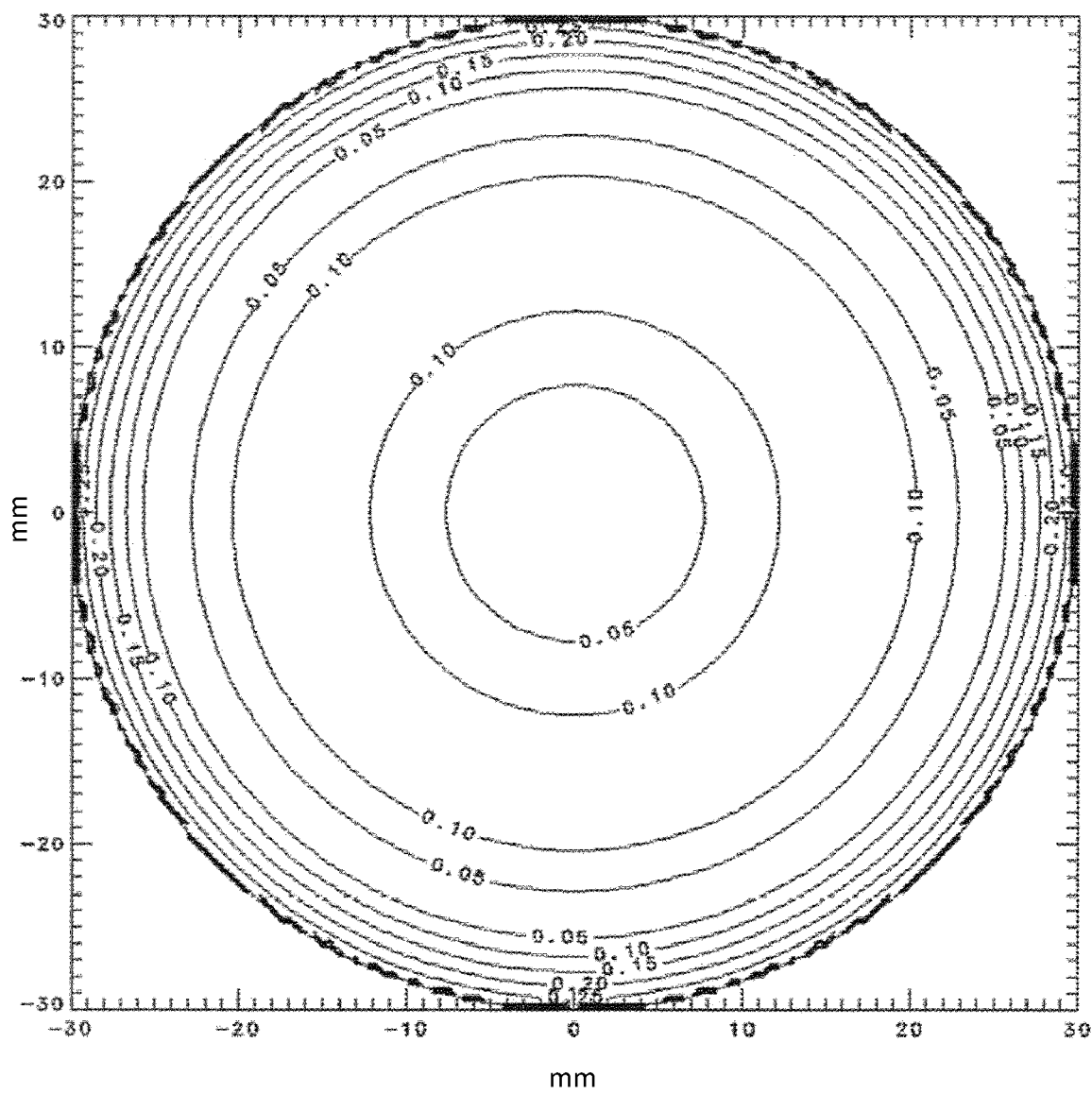
FIG. 9 shows the distribution of the astigmatic difference over the entire front face of a calculated spectacle lens according to a fourth exemplary embodiment.

FIG. 9 shows the distribution of the astigmatic difference for the viewing eye of the spectacle wearer over the entire front face of the calculated spectacle lens from example 4 in a diameter of 60 mm. Here too, the eye rotated about the center of rotation of the eye. FIG. 9 also shows that this astigmatic difference increases from the middle toward the edge from 0.0 D to 0.3 D.

Example 5

Calculation of a varifocal lens bounded by spherical surfaces and having spherical correction for distance vision of sph −4.0 D and having spherical correction for close vision of sph −3.0 D, in which a constant refractive index of $n_d=1.523$ has been used for the ultrathin lenses of components A and C. Component B was based on a location-dependent calculated refractive index distribution (in table 7 below: GRIN (gradient index)). Table 7 below illustrates the data of the spectacle lens-eye system.

TABLE 7

| | Radius of curvature [mm] | Thickness [mm] | $n_d$ | Diameter [mm] |
|---|---|---|---|---|
| 1 | 102.90 | 0.1 | 1.523 | 60 |
| 2 | 102.90 | 1.0 | GRIN | 60 |
| 3 | 63.21 | 0.1 | 1.523 | 60 |
| 4 | 63.21 | 25[1)] | 1.0 | 60 |

Figure 10:
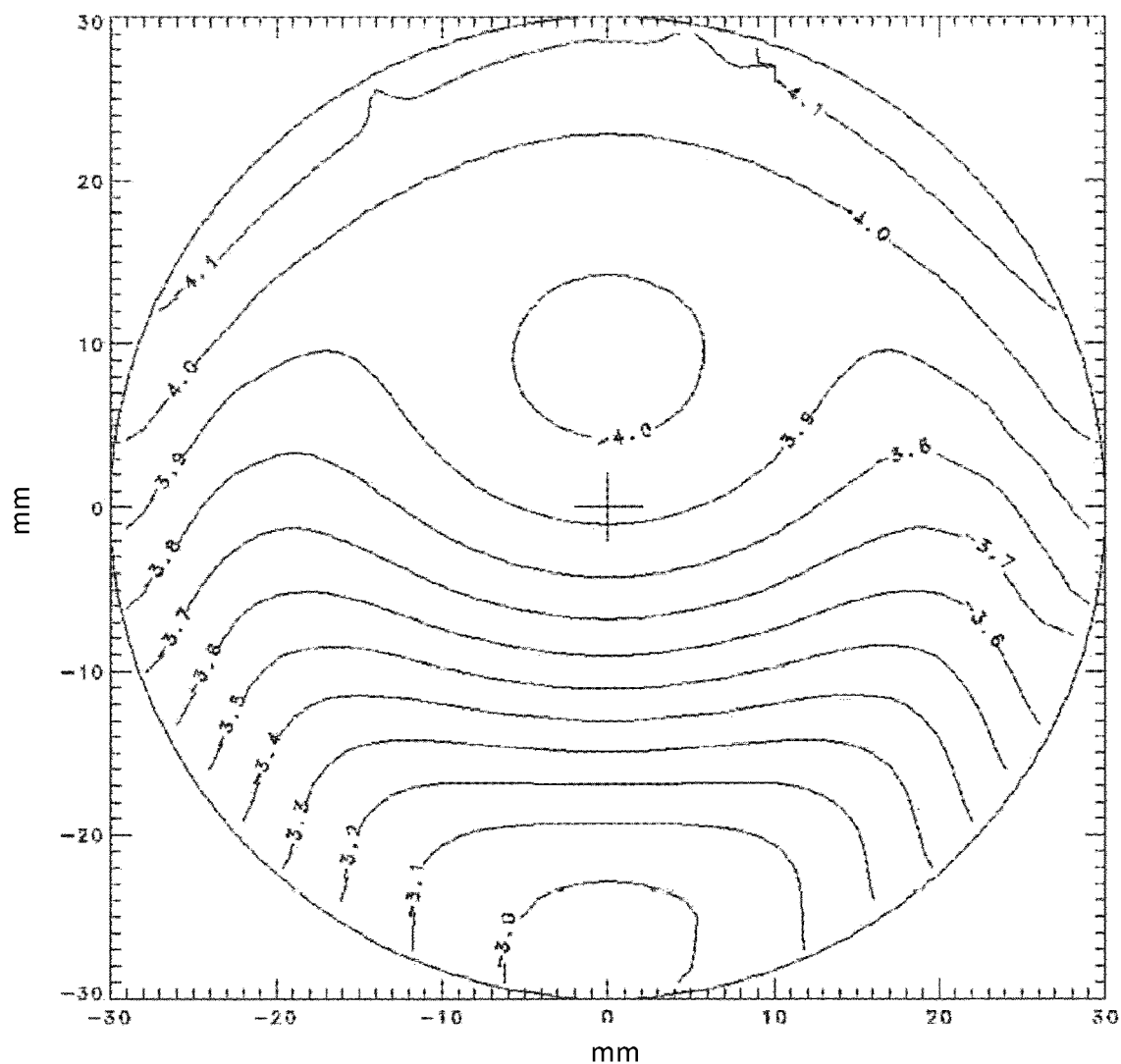
FIG. 10 shows the distribution of the average strength over the entire front face of a calculated spectacle lens according to a fifth exemplary embodiment.

FIG. 10 shows the distribution of the average strength for the viewing eye of the spectacle wearer over the entire front face of the calculated spectacle lens from example 5 in a diameter of 60 mm. The eye rotated here about the center of rotation of the eye. FIG. 10 also shows that the average strength of the spectacle lens, from the distance region to the close region, changes from spherical correction for distance vision of sph −4.0 D to spherical correction for close vision of sph −3.0.

Figure 11:
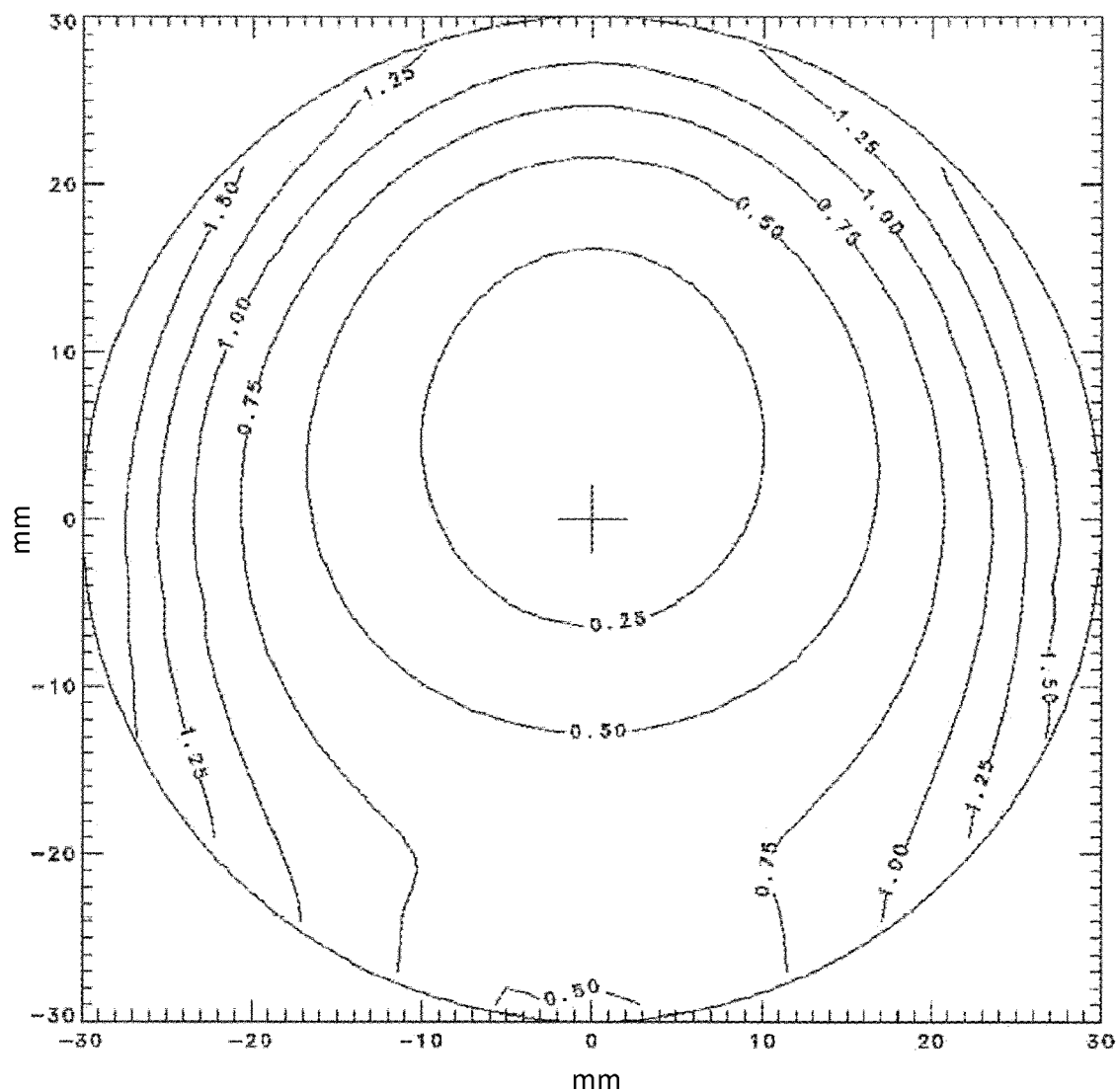
FIG. 11 shows the distribution of the astigmatic difference over the entire front face of a calculated spectacle lens according to a fifth exemplary embodiment.

FIG. 11 shows the distribution of the astigmatic difference for the viewing eye of the spectacle wearer over the entire front face of the calculated spectacle lens from example 5 in a diameter of 60 mm. Here too, the eye rotated about the center of rotation of the eye. The astigmatic difference in distance vision is 0.0 D, and assumes a maximum value of 1.7 D at the edge of the spectacle lens.

Figure 12:
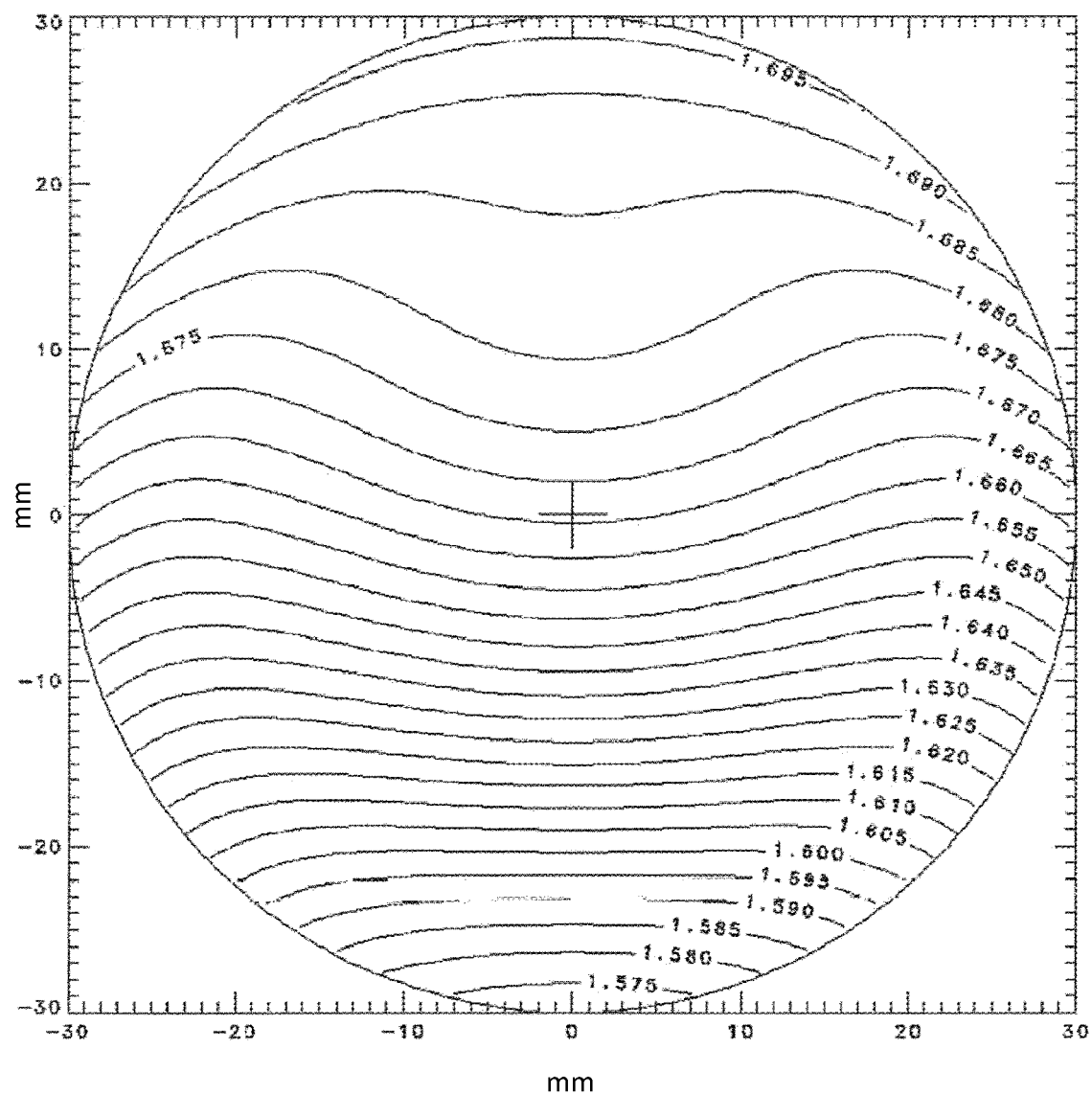
FIG. 12 shows the refractive index distribution within component B of a spectacle lens according to a fifth exemplary embodiment.

FIG. 12 shows the refractive index distribution within component B of the spectacle lens from example 5. The calculation of the radial refractive index distribution was based on the following formula: $n_d=1.66+c1+c3 \cdot h^2+c4 \cdot h^4+c5 \cdot h^6+c6 \cdot h^8+c12 \cdot x^2+c14 \cdot y+c16 \cdot y^3$, with
$c1=0.607519072 \cdot 10^{-2}$
$c3=-0.695183752 \cdot 10^{-4}$
$c4=0.252437173 \cdot 10^{-7}$
$c5=0.261202427 \cdot 10^{-10}$
$c6=-0.132339396 \cdot 10^{-13}$
$c12=0.310744312 \cdot 10^{-4}$
$c14=0.211793858 \cdot 10^{-2}$
$c16=-0.144639672 \cdot 10^{-7}$
where: $h^2=x^2+y^2$ (distance from the optical axis).

As can be inferred from the FIGS. corresponding to example 5, the use of a location-dependent calculated refractive index distribution (gradient index, GRIN) brings about a continuous change in strength of the spectacle lens from distance vision to close vision and a distribution in the astigmatic difference. The result is thus a spectacle lens having varifocal lens properties.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising, proceeding from a front face on an object side of the spectacle lens to an opposite reverse face of the spectacle lens, a component A, a component B, and a component C, wherein:
   a) the component A includes at least one of a functional layer or an ultrathin lens;
   b) the component B includes a polymeric material having a location-dependent refractive index distribution; and
   c) the component C includes at least one of the functional layer or the ultrathin lens;
   or
   a) the component A includes the ultrathin lens with an average thickness within a range of from 10 µm to 760 µm;
   b) the component B includes the polymeric material having a uniform refractive index; and
   c) the component C includes at least one of the functional layer or the ultrathin lens with the average thickness within the range of from 10 µm to 760 µm.

2. The spectacle lens as claimed in claim 1, wherein the ultrathin lens of component A or the ultrathin lens of the component C in each case have the average thickness of from 13 µm to 510 µm.

3. The spectacle lens as claimed in claim 1, wherein the ultrathin lens of the component A includes the functional layer on a front face and the ultrathin lens of the component C includes the functional layer on a reverse face.

4. The spectacle lens as claimed in claim 3, wherein the functional layer of the component A and the functional layer of the component C are each selected from the group consisting of an antireflection layer, an electrically conductive layer, a semiconductive layer, an antifog layer, and a clean-coat layer.

5. The spectacle lens as claimed in claim 3, wherein the front face of the ultrathin lens of the component A proceeding from the front face in an object direction, or the reverse face of the component C proceeding from the reverse face in an eye direction, is covered in each case by the following functional layers:
   a) optionally, an electrically conductive layer or a semiconductive layer;
   b) an antireflection layer; and
   c) an antifog layer, a clean-coat layer, or the antifog layer and the clean-coat layer.

6. The spectacle lens as claimed in claim 1, wherein the functional layer of the component A and the functional layer of the component C are each selected from the group consisting of a hard lacquer layer, an antireflection layer, an antifog layer, a clean-coat layer, an electrically conductive layer, and a semiconductive layer.

7. A spectacle lens comprising, proceeding from a front face on an object side of the spectacle lens to an opposite reverse face of the spectacle lens, a component A, a component B, and a component C, wherein:
   a) the component A includes at least one of a functional layer or an ultrathin lens;
   b) the component B includes a polymeric material having a location-dependent refractive index distribution; and
   c) the component C includes at least one of the functional layer or the ultrathin lens;
   or
   a) the component A includes the ultrathin lens with an average thickness within a range of from 10 µm to 760 µm;
   b) the component B includes the polymeric material having a uniform refractive index; and
   c) the component C includes at least one of the functional layer or the ultrathin lens with the average thickness within the range of from 10 µm to 760 µm,
      wherein a surface topography of at least one of the ultrathin lens of the component A or the ultrathin lens of component C is selected from the group consisting of spherical, aspherical, toric, atoric, progressive, and planar.

8. A spectacle lens comprising, proceeding from a front face on an object side of the spectacle lens to an opposite reverse face of the spectacle lens, a component A, a component B, and a component C, wherein:
   a) the component A includes at least one of a functional layer or an ultrathin lens;
   b) the component B includes a polymeric material having a location-dependent refractive index distribution; and
   c) the component C includes at least one of the functional layer or the ultrathin lens;
   or
   a) the component A includes the ultrathin lens with an average thickness within a range of from 10 µm to 760 µm;
   b) the component B includes the polymeric material having a uniform refractive index; and
   c) the component C includes at least one of the functional layer or the ultrathin lens with the average thickness within the range of from 10 µm to 760 µm,
      wherein a surface topography of at least one of the ultrathin lens of the component A or the ultrathin lens of the component C is configured to achieve an optical correction effect of the spectacle lens, and wherein the polymeric material of the component B has the uniform refractive index.

9. The spectacle lens as claimed in claim 1, wherein the spectacle lens is configured to have an optical correction effect via a calculated location-dependent refractive index distribution within the component B.

10. A spectacle lens comprising, proceeding from a front face on an object side of the spectacle lens to an opposite reverse face of the spectacle lens, a component A, a component B, and a component C, wherein:
   a) the component A includes at least one of a functional layer or an ultrathin lens;
   b) the component B includes a polymeric material having a location-dependent refractive index distribution; and c) the component C includes at least one of the functional layer or the ultrathin lens;
or
a) the component A includes the ultrathin lens with an average thickness within a range of from 10 µm to 760 µm;
b) the component B includes the polymeric material having a uniform refractive index; and
c) the component C includes at least one of the functional layer or the ultrathin lens with the average thickness within the range of from 10 µm to 760 µm,
wherein a surface topography of at least one of the ultrathin lens of the component A or the ultrathin lens of the component C is configured to achieve an optical correction effect of the spectacle lens, and wherein the component B has a calculated location-dependent refractive index distribution.

11. A spectacle lens comprising, proceeding from a front face on an object side of the spectacle lens to an opposite reverse face of the spectacle lens:
a component A including an ultrathin lens;
a component B including a polymeric material; and
a component C including the ultrathin lens;
wherein the spectacle lens is a monofocal spectacle lens, wherein a surface topography of a front face of the ultrathin lens of the component A is a same as the surface topography of a reverse face of the ultrathin lens of the component A, and is selected from the group consisting of spherical, toric, aspherical, and atoric, and wherein the surface topography of the front face of the ultrathin lens of the component C is the same as the surface topography of the reverse face of the ultrathin lens of the component C and is selected from the group consisting of spherical, toric, aspherical and atoric, and the polymeric material of the component B has a uniform refractive index or a location-dependent refractive index distribution, or
wherein the spectacle lens is a monofocal spectacle lens, the surface topographies of the front face of the ultrathin lens of the component A, of the reverse face of the ultrathin lens of the component A, the front face of the ultrathin lens of the component C, and the reverse face of the ultrathin lens of component C are each planar and the polymeric material of the component B has a location-dependent refractive index distribution.

12. A spectacle lens comprising, proceeding from the front face on the object side of the spectacle lens to the opposite reverse face of the spectacle lens:
a component A including at least an ultrathin lens;
a component B including a polymeric material; and
a component C including the ultrathin lens,
wherein the spectacle lens is a varifocal spectacle lens, the surface topography of the front face of the component A is a same as the surface topography of the reverse face of the ultrathin lens of component A and is selected from the group consisting of spherical, toric, aspherical, atoric, and planar, and wherein the surface topography of the front face of the component C is the same as the surface topography of the reverse face of the ultrathin lens of the component C and is selected from the group consisting of spherical, toric, aspherical, atoric, and planar, and the polymeric material of component B has a location-dependent refractive index distribution or
wherein the spectacle lens is a varifocal spectacle lens, and wherein the surface topographies of the front face of the component A, the reverse face of the ultrathin lens of component A, the front face of the component C, and the reverse face of the ultrathin lens of the component C are each progressive and the polymeric material of the component B has a uniform refractive index or a location-dependent refractive index distribution.

13. A spectacle lens comprising, proceeding from a front face on an object side of the spectacle lens to an opposite reverse face of the spectacle lens, a component A, a component B, and a component C, wherein:
a) the component A includes at least one of a functional layer or an ultrathin lens;
b) the component B includes a polymeric material having a location-dependent refractive index distribution; and
c) the component C includes at least one of the functional layer or the ultrathin lens;
or
a) the component A includes the ultrathin lens with an average thickness within a range of from 10 µm to 760 µm;
b) the component B includes the polymeric material having a uniform refractive index; and
c) the component C includes at least one of the functional layer or the ultrathin lens with the average thickness within the range of from 10 µm to 760 µm,
wherein, if the component B has the uniform refractive index, a difference in refractive indices between the component B and a directly adjoining functional layer or component is not greater than 0.3, and, if the component B has the location-dependent refractive index distribution, the average refractive index of the component B differs from the refractive index of the directly adjoining functional layer or component by not more than 0.3.

14. A spectacle lens comprising, proceeding from a front face on an object side of the spectacle lens to an opposite reverse face of the spectacle lens, a component A, a component B, and a component C, wherein:
a) the component A includes at least one of a functional layer or an ultrathin lens;
b) the component B includes a polymeric material having a location-dependent refractive index distribution; and
c) the component C includes at least one of the functional layer or the ultrathin lens;
or
a) the component A includes the ultrathin lens with an average thickness within a range of from 10 µm to 760 µm;
b) the component B includes the polymeric material having a uniform refractive index; and
c) the component C includes at least one of the functional layer or the ultrathin lens with the average thickness within the range of from 10 µm to 760 µm,
wherein, if component B has the uniform refractive index, a difference in refractive index of an adhesive between the component B and the refractive index of an adjoining adhesive is not greater than 0.3, and, if the component B has the location-dependent refractive index distribution, an average refractive index of the component B differs from the refractive index of the adjoining adhesive by not more than 0.3.

15. A process for producing a spectacle lens having, proceeding from a front face on an object side of the spectacle lens to an opposite reverse face of the spectacle lens, at least components A, B, and C, wherein the component A includes at least one of a functional layer or an ultrathin lens, the component B includes a polymeric material, and the component C includes at least one of the functional layer or the ultrathin lens, the process comprising:

providing and optionally fixing the ultrathin lens of the component A or the ultrathin lens of the component C, or providing a support structure configured as a negative mold of a front face of the component B or of a reverse face of the component B;

providing a three-dimensional model of the component B;

digitally cutting the three-dimensional model of the component B into individual two-dimensional slices;

providing a printing ink including a radiation-curable component;

constructing the component B with a printing operation on one of the ultrathin lenses of the component A, the component C, or on the support structure as a sum total of the individual two-dimensional slices;

curing the component B with ultraviolet (UV) light, wherein the curing is effected fully or partially after each application of individual volume elements or after application of a slice of volume elements, and the partial curing is completed on completion of the printing process;

optionally, performing at least one of machining, grinding, turning, or polishing the surface of the component B that does not adjoin one of the ultrathin lens of the component A or the ultrathin lens of the component C or the support structure;

bonding the reverse face of the component B of the spectacle lens to the front face of the ultrathin lens of the component C or coating the reverse face of the component B with the functional layer if the ultrathin lens of the component A has been provided;

bonding the front face of the component B of the spectacle lens to the reverse face of the ultrathin lens of the component A or coating the front face of the component B with the functional layer if the ultrathin lens of the component C has been provided; or coating the front face of the component B with the functional layer and coating the reverse face of the component B with the functional layer in each case by a printing method or by spin-coating if the support structure has been provided; and edging the spectacle lens.

16. The process as claimed in claim 15, further comprising:

bonding at least one the component A and the component B or the component B and the component C with an adhesive or with a bonding method.

17. The process as claimed in claim 15, wherein radii of curvature of at least one the component A and the component B or the component B and the component C to be bonded with an adhesive differ from one each other by less than 1 mm.

18. The process as claimed in claim 15, further comprising:

bonding at least one the component A and the component B or the component B and the component C with an adhesive based on an amine-catalyzed thiol hardening of an epoxy resin.

19. The process as claimed in claim 15, wherein the printing ink comprises at least one radiation-curable component and optionally at least one colorant, and the radiation-curable component comprises at least one monomer from the group consisting of (meth)acrylate monomers, epoxy monomers, vinyl monomers and allyl monomers and a) i) a total proportion of at least one kind of monofunctional (meth)acrylate monomer is within a range from 0.0% by weight to 35.0% by weight, based on the total weight of the printing ink, or the total proportion of at least one kind of monofunctional epoxy monomer, vinyl monomer or allyl monomer or of a mixture of different monofunctional (meth)acrylate monomers, epoxy monomers, vinyl monomers or allyl monomers is in each case within a range from 0.0% by weight to 60% by weight, based in each case on the total weight of the printing ink, and/or ii) the total proportion of at least one kind of difunctional (meth)acrylate monomer, epoxy monomer, vinyl monomer or allyl monomer or of a mixture of different difunctional (meth)acrylate monomers, epoxy monomers, vinyl monomers or allyl monomers is in each case within a range from 32.0% by weight to 99% by weight, based in each case on the total weight of the printing ink, and/or iii) the total proportion of at least one kind of trifunctional (meth)acrylate monomer, epoxy monomer, vinyl monomer or allyl monomer or of a mixture of different trifunctional (meth)acrylate monomers, epoxy monomers, vinyl monomers or allyl monomers is in each case within a range from 1.0% by weight to 51.0% by weight, based in each case on the total weight of the printing ink, and/or iv) the total proportion of at least one kind of tetrafunctional (meth)acrylate monomer, epoxy monomer, vinyl monomer or allyl monomer or of a mixture of different tetrafunctional (meth)acrylate monomers, epoxy monomers, vinyl monomers or allyl monomers is in each case within a range from 0% by weight to 16% by weight, based in each case on the total weight of the printing ink, or b) the printing ink comprises at least one monofunctional radiation-curable component and at least one difunctional radiation-curable component in a weight ratio of 1:1 or at least one monofunctional radiation-curable component and at least one trifunctional radiation-curable component in the weight ratio of 1:5 or at least one difunctional radiation-curable component and at least one trifunctional radiation-curable component in the weight ratio of 1:1 or at least one difunctional radiation-curable component and at least one tetrafunctional radiation-curable component in the weight ratio of 5:1 or at least one monofunctional radiation-curable component and at least one difunctional radiation-curable component and at least one trifunctional radiation-curable component in the weight ratio of 1:5:1.

20. A method of constructing the component B of the spectacle lens according to claim 1, the method comprising:

printing the component B with a printing ink, wherein the component B has a uniform refractive index or a location-dependent refractive index distribution.

* * * * *

UNITED STATES PATENT AND TRADEMARK OFFICE
CERTIFICATE OF CORRECTION

PATENT NO. : 11,614,640 B2
APPLICATION NO. : 16/387521
DATED : March 28, 2023
INVENTOR(S) : Timo Mappes, Gerhard Kelch and Thomas Glöge It is certified that error appears in the above-identified patent and that said Letters Patent is hereby corrected as shown below:

In the Specification

Column 3, Line 65, change "a exemplary" to -- an exemplary --

Column 6, Line 40, change "of component B of component B" to -- of component B --

Column 9, Line 18, change "SaO" to -- SbO --

Column 14, Line 48, change "Konzeption and" to -- Konzeption und --

Signed and Sealed this
Nineteenth Day of September, 2023

Katherine Kelly Vidal
*Director of the United States Patent and Trademark Office*